(12) United States Patent
Ikeda et al.

(10) Patent No.: US 6,722,693 B2
(45) Date of Patent: Apr. 20, 2004

(54) AIRBAG

(75) Inventors: Takanobu Ikeda, Aichi-ken (JP);
Takashi Yamamoto, Aichi-ken (JP);
Katsuhiko Kato, Aichi-ken (JP); Shoji Okajima, Aichi-ken (JP); Mitsuru Sugaya, Aichi-ken (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/378,815

(22) Filed: Mar. 5, 2003

(65) Prior Publication Data

US 2003/0205889 A1 Nov. 6, 2003

(30) Foreign Application Priority Data

Apr. 2, 2002 (JP) ........................ 2002-099965
Apr. 12, 2002 (JP) ........................ 2002-111057

(51) Int. Cl.$^7$ .............................................. B60R 21/22
(52) U.S. Cl. ................... 280/730.2; 280/743.1
(58) Field of Search ...................... 280/730.1, 730.2, 280/728.1, 743.1

(56) References Cited

U.S. PATENT DOCUMENTS

| | | | | |
|---|---|---|---|---|
| 6,250,533 B1 | * | 6/2001 | Otterbein et al. | ............ 228/47.1 |
| 6,296,269 B1 | * | 10/2001 | Nagai et al. | ............ 280/728.2 |
| 6,431,587 B1 | * | 8/2002 | O'Docherty | ............ 280/730.2 |
| 6,585,292 B2 | * | 7/2003 | Abe et al. | ............ 280/743.1 |
| 6,612,610 B1 | * | 9/2003 | Aoki et al. | ............ 280/730.2 |
| 6,616,179 B2 | * | 9/2003 | Tanase et al. | ............ 280/730.2 |
| 6,619,690 B2 | * | 9/2003 | Tanase et al. | ............ 280/730.2 |

FOREIGN PATENT DOCUMENTS

JP        A-11-321532        11/1999

OTHER PUBLICATIONS

U.S. patent application Ser. No. 10/014,443, Ogawa et al., filed Dec. 14, 2001.

* cited by examiner

*Primary Examiner*—Paul N. Dickson
*Assistant Examiner*—Toan To
(74) *Attorney, Agent, or Firm*—Posz & Bethards, PLC

(57) ABSTRACT

An airbag according to the present invention comprises an airbag body and a plurality of tearable wrapping yarns. The wrapping yarns are wound around the outer circumference of the wrapping area of the airbag body as folded into a generally rod-like shape, along the axial direction of the airbag body and to obliquely intersect the axial direction. In the wrapping area, at least two of the wrapping yarns are wound from the opposite directions to each other. The distance between the adjacent wrapping yarns along the axial direction of the airbag body is within the range of 20 to 60 mm in the wrapping area. The yarn strength of each wrapping yarn is within the range of 7.4 to 65N. In the airbag of the present invention, the airbag body in the wrapping area is kept in a compact shape by a simple wrapping work, while securing the smooth expansion and inflation.

14 Claims, 19 Drawing Sheets

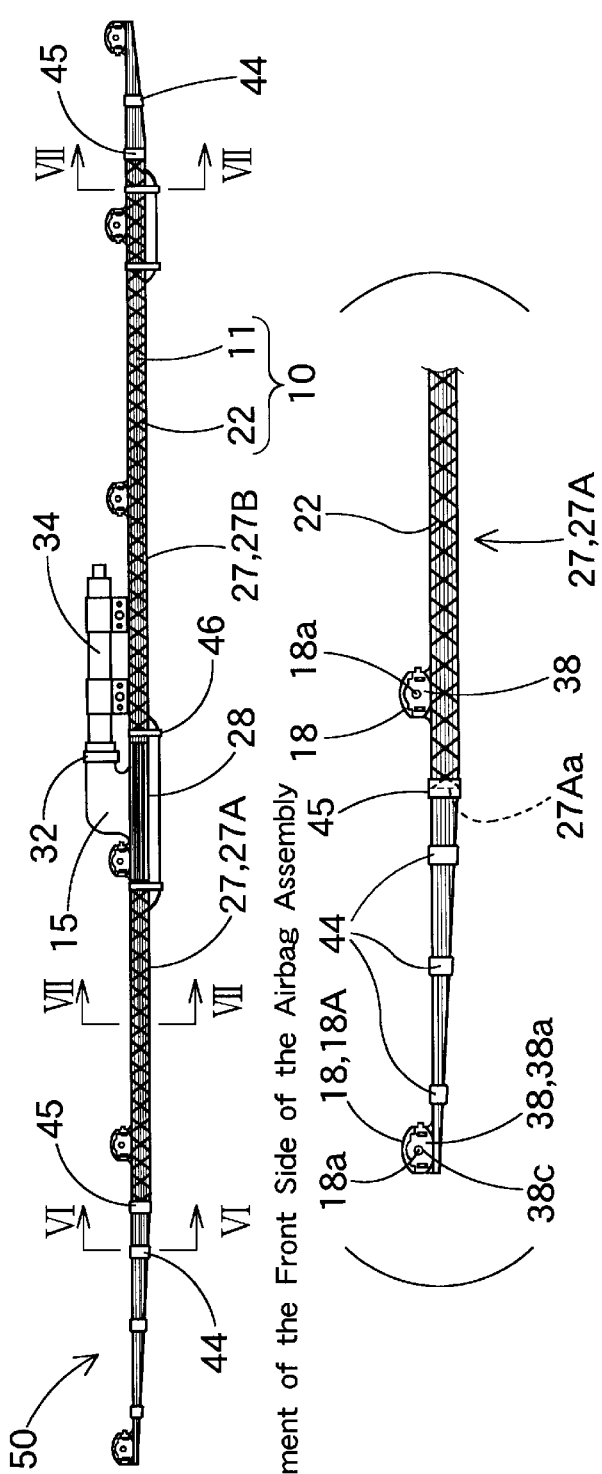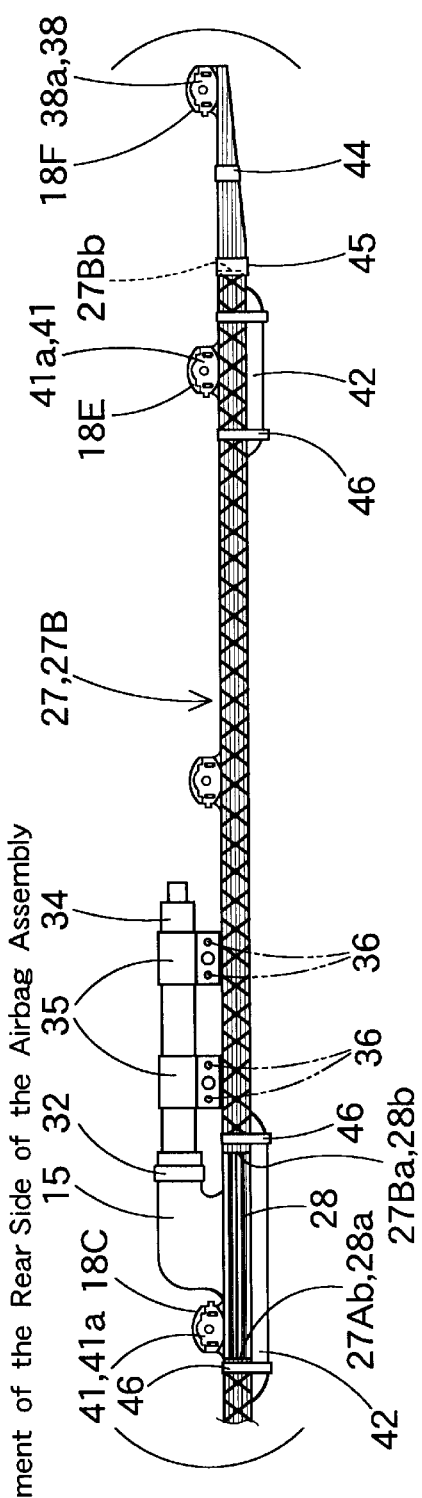
Fig.5A
Enlargement of the Front Side of the Airbag Assembly
Fig.5B
Enlargement of the Rear Side of the Airbag Assembly
Fig.5C

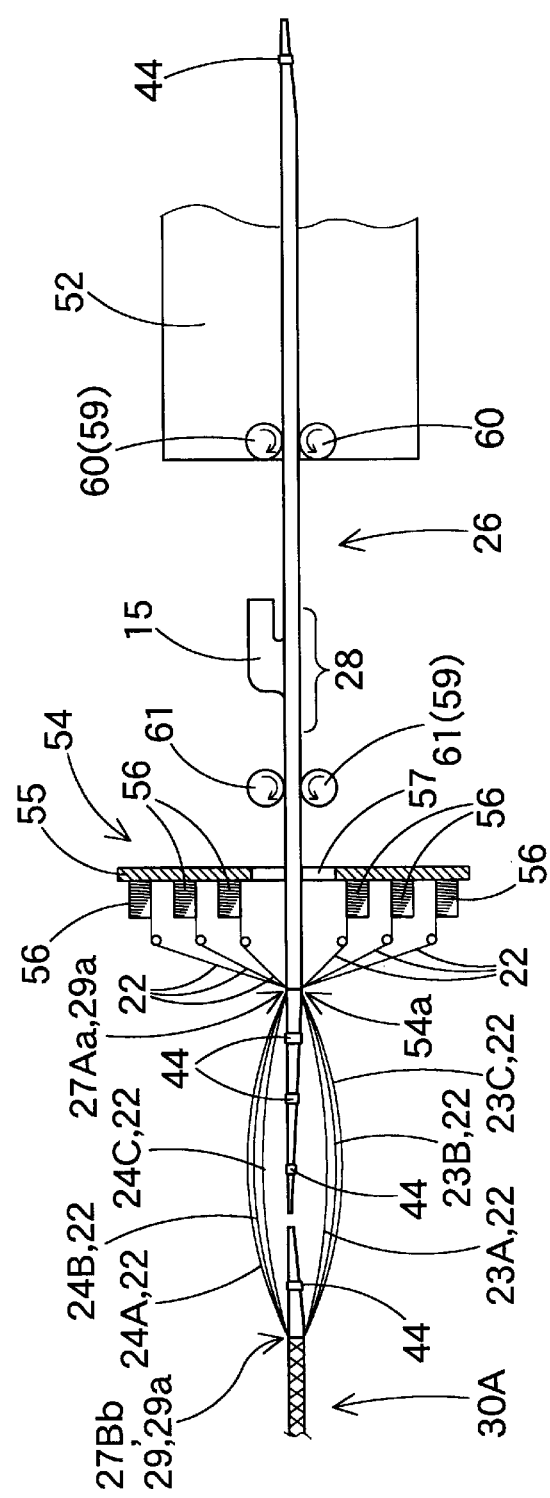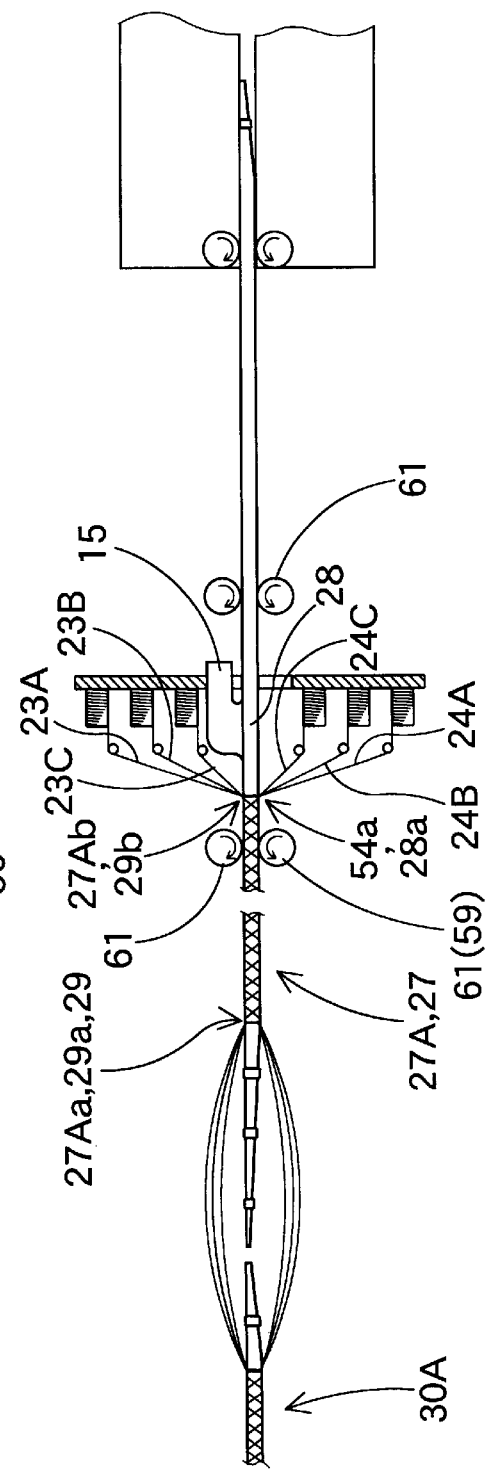
Fig.12A
Fig.12B

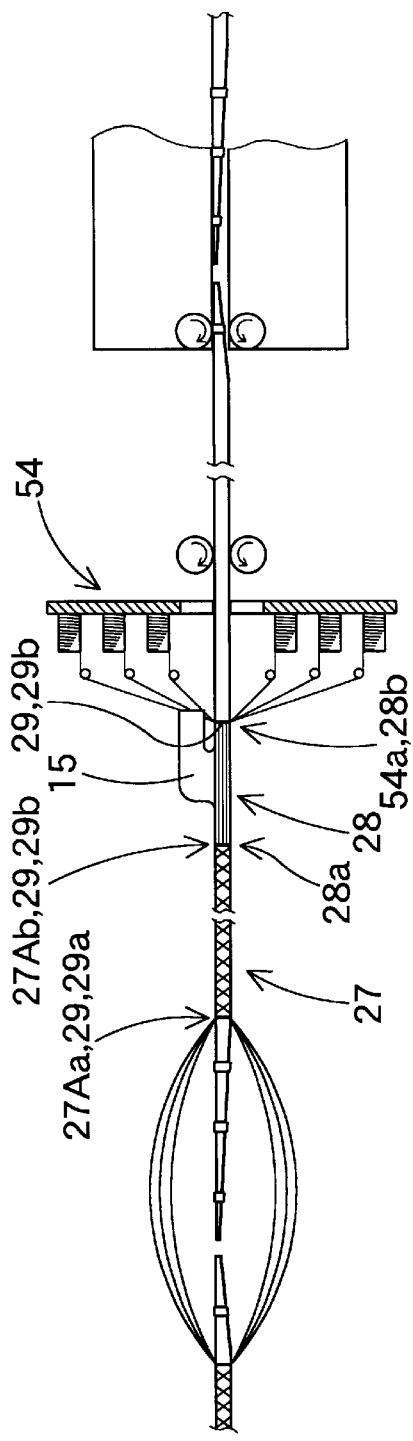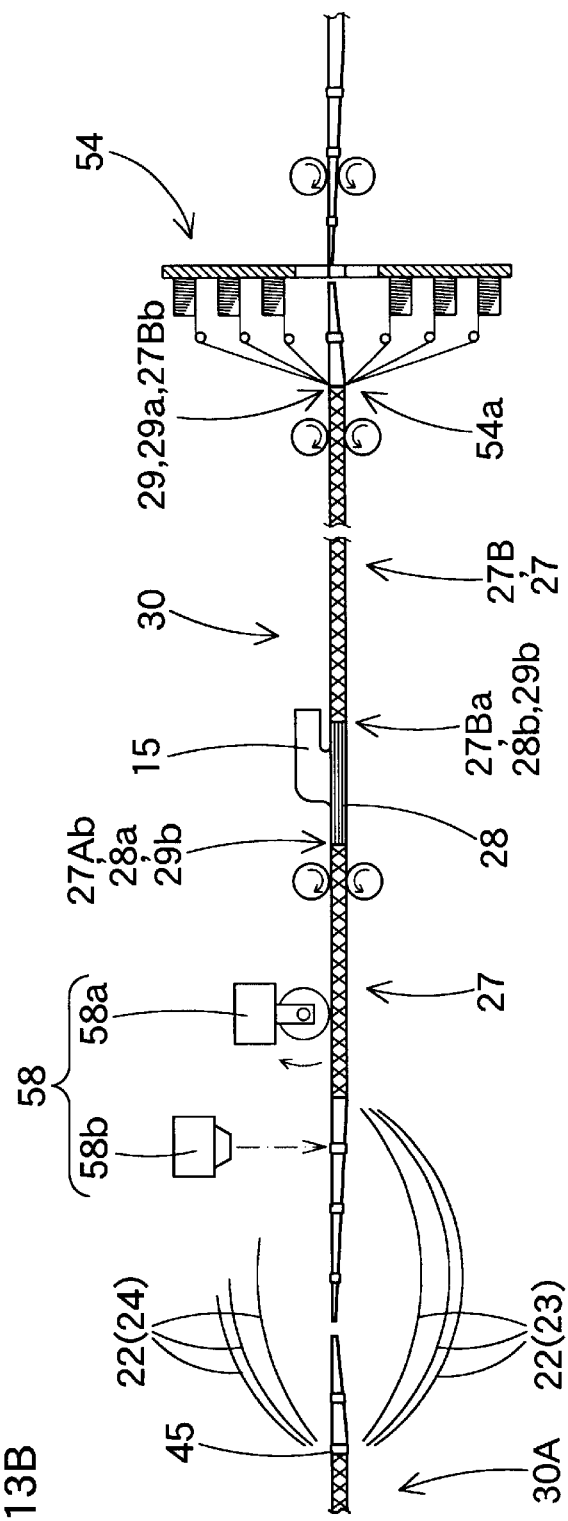
Fig.13A
Fig.13B

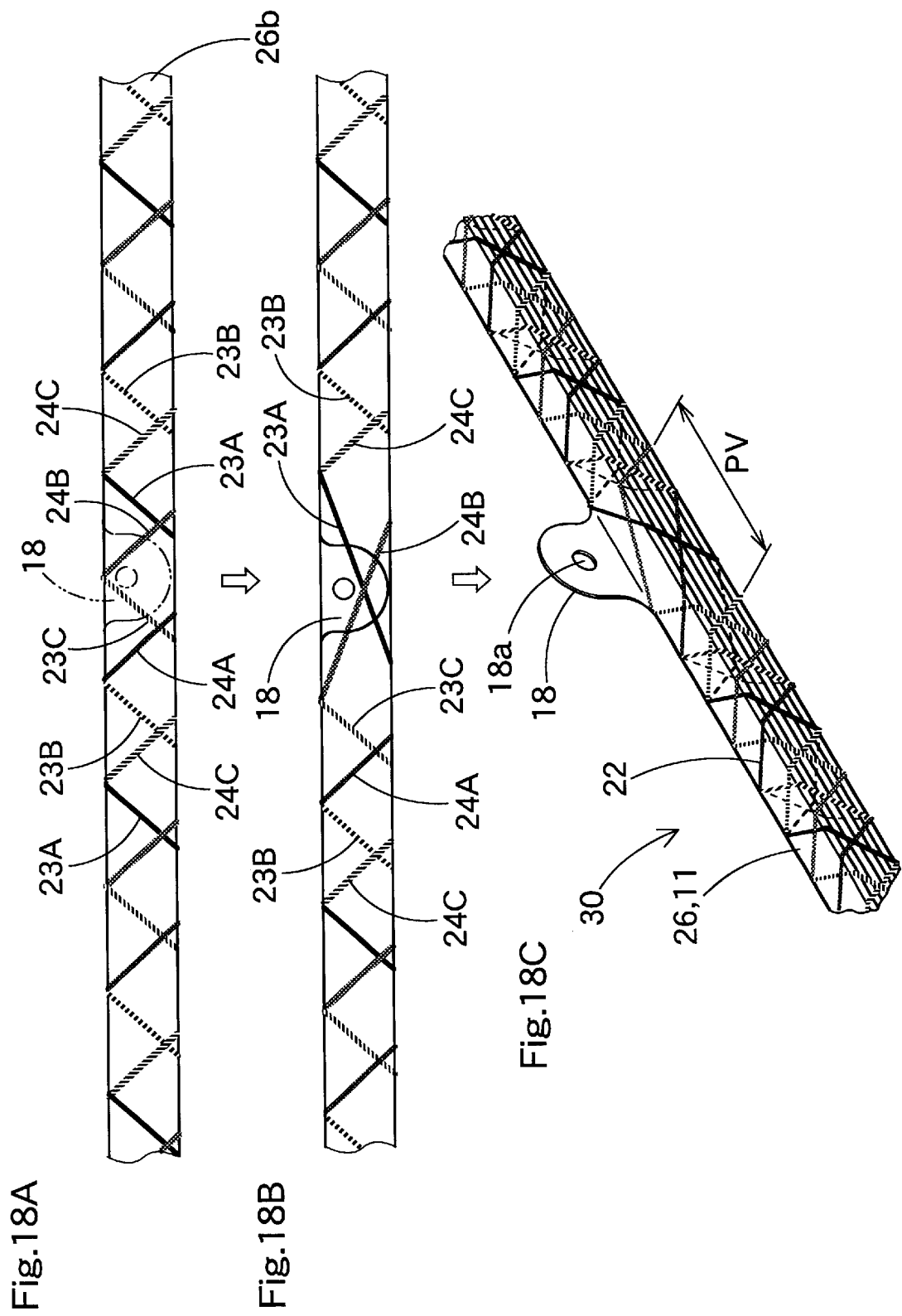

Enlargement of the Front Side of the Airbag Assembly

Enlargement of the Rear Side of the Airbag Assembly

AIRBAG

The present application claims priority to Japanese Patent Application of Ikeda et al., filed Apr. 2, 2002, under No. 2002-099965, and Japanese Patent Application of Kato et al., filed Apr. 12, 2002, under No. 2002-111057, the entirety of each is hereby incorporated into the present application by this reference.

BACKGROUND OF THE INVENTION

1. Field of the Invention

The present invention relates to an airbag used in a head protecting airbag device to be mounted on an automobile. Specifically, an airbag according to the present invention comprises an airbag body, and a tearable wrapping material for keeping the airbag body in a folded state. The airbag body is folded and housed in the peripheral edge of an opening at the interior side of a vehicular body, and expands and inflates so as to cover the vehicle's interior side of the opening when inflation gas flows thereinto. After folding, the airbag body is wrapped by the wrapping material.

2. Description of Related Art

As disclosed in Japanese Patent Laid-Open No. Hei 11-321532, in the airbag for the head protecting airbag device of this kind in the prior art, a folded airbag body is wrapped by a wrapping material such as a tape member to keep itself in a folded state. Without this wrapping material, the airbag body, after being folded up, returns to the unfolded state and loses its folded-up configuration because of spring-back mechanism. Then the airbag body becomes bulky so that it cannot be mounted on the vehicle.

The wrapping member in the prior art was wound around the airbag body as folded into a generally rod-like shape, along the axis' circumferential direction so as to intersect the axial direction of the airbag body perpendicularly. The folded airbag body was wound at several positions intermittently along its axial direction.

In the airbag in the prior art, more specifically, the portions wrapped by the wrapping member and the portions not wrapped are arranged alternately along the airbag body's axial direction in the wrapping area. This inevitably leaves the portions not wrapped bulging due to the spring-back. Here arises a difficulty in housing the airbag body in a narrow housing portion when mounting on a vehicle.

Here, it is conceivable to wrap the airbag body with a bag-shaped (or cylindrical) wrapping member so that the airbag body may keep its folded-up configuration over its generally entire length. In this case, however, it would be troublesome to insert the folded airbag into the wrapping member if the wrapping member has a small diameter. If the wrapping member has a sufficient diameter, the diameter needs to be reduced after inserting the folded airbag body into the wrapping member. This work has to be applied over the entire length of the airbag body, which is troublesome, too.

Moreover, the smooth expansion and inflation from the wrapped state also needs to be considered as well as compact-wrapping of the airbag body.

SUMMARY OF THE INVENTION

The present invention contemplates to solve the above-specified problems, and therefore, its object is to provide an airbag which is capable of keeping the airbag body in the wrapping area in a compact shape by a simple wrapping work, while securing a smooth expansion and inflation.

The first airbag according to the present invention comprises an airbag body and a tearable wrapping member for keeping the airbag body in the folded state. The airbag body is folded and housed in the opening peripheral edge at the interior side of a vehicular body. The airbag body is wrapped by a wrapping member after being folded in such a manner as to expand and inflate to cover the opening when the inflation gas flows thereinto. The wrapping member is constructed of a plurality of wrapping yarns having flexibility. The plurality of wrapping yarns are wound around the airbag body as folded into a generally rod-like shape over the generally entire length in the wrapping area, along the airbag body's axial direction, and in a manner to obliquely intersect the axial direction. At least two of the wrapping yarns are wound around the folded airbag body in the wrapping area from the opposite directions. The distance between the adjacent yarns along the axial direction of the folded airbag body, with respect to the wrapping yarns wound in the same direction in the wrapping area, is within the range of 20 to 60 mm, when the wrapping yarns are wound around the folded airbag body. The yarn strength of these wrapping yarns according to JIS L 1013.7.5 is within the range of 7.4 to 65N.

In the first airbag according to the present invention, a plurality of wrapping yarns constituting the wrapping member are not arranged intermittently, but wound around the folded and rod-shaped airbag body along the axial direction of the airbag body, and in a manner to intersect the axial direction of the airbag body obliquely, in the wrapping area of the airbag body. Moreover, at least two of the wrapping yarns are wound around the folded airbag body from the opposite directions.

In the first airbag according to the present invention, accordingly, most part of the outer circumference around the airbag body is held by the wrapping yarns at more than one positions in the wrapping area. As a result, the compactly folded state of the airbag body is uniformly kept along the axial direction of the airbag body. More specifically, even with only two wrapping yarns, those yarns are wound around the folded airbag body in the opposite directions. In this case, two yarns hold the outer circumference around the airbag body only at one position by their intersection. However, in the portion between the intersections apart from the intersection, two yarns are separated from each other to hold the outer circumference of the airbag body. Therefore, the airbag body is wrapped compactly.

Moreover, the wrapping work can be made easily by winding a plurality of wrapping yarns generally helically around the airbag body so as to intersect the axial direction of the airbag body obliquely.

Especially in the present invention, a plurality of wrapping yarns are wound around the folded airbag body, while the distance between the adjacent yarns along the axial direction of the folded airbag body is within the range of 20 to 60 mm, with respect to the wrapping yarns wound in the same direction. Moreover, the yarn strength of the wrapping yarns according to JIS L 1013.7.5 is within the range of 7.4 to 65N. Therefore, the airbag body is wrapped compactly without degrading the expanding property of the airbag.

More specifically, if the distance between the adjacent yarns is less than 20 mm, the density of the wrapping yarns per unit length along the axial direction of the airbag body becomes high. Then the resistance in breaking the wrapping yarns becomes big when the airbag body breaks the individual wrapping yarns to expand and inflate, which is likely to delay the expansion of the airbag. On the contrary, if the distance between the adjacent yarns is more than 60 mm, the area of the airbag body not held by the yarns enlarges in the axial direction of the airbag body, and therefore, the area is likely to bulge, which checks the effect of the present invention of wrapping the airbag body compactly.

Therefore, it is desired that the distance between the adjacent yarns along the axial direction of the folded airbag body, with respect to the wrapping yarns wound in the same direction, be set within the range of 20 to 60 mm.

Moreover, if the yarn strength of each wrapping yarn according to JIS L 1013.7.5 is less than 7.4N, the wrapping yarn is torn when the wrapped airbag body is bent, and fails to wrap the airbag body compactly. On the contrary, if the yarn strength of each wrapping yarn according to JIS L 1013.7.5 is more than 65N, the resistance in breaking the wrapping yarns becomes big when the airbag body breaks the individual wrapping yarns to expand and inflate, which delays the expansion of the airbag.

From the above-described viewpoints, it is desired that the yarn strength of the wrapping yarns according to JIS L 1013.7.5 be within the range or 7.4 to 65N, or within the range of 18.7 to 41N, more desirably.

Therefore, in the first airbag according to the present invention, the airbag body in the wrapping area is kept in a compact shape by a simple wrapping work while securing a smooth expansion and inflation. Moreover, the airbag body keeps its compact shape even if the airbag body is bent after being wrapped.

The wrapping yarns in the wrapping area are wound around the folded airbag body at the intersection angle of 45° or more with respect to the axial direction of the folded airbag body. With this construction, the airbag body is further prevented from loosing the folded-up shape even if the wrapped airbag body is bent.

More specifically, when the wrapped airbag body is bent at approximately 180° and is returned, the part of the airbag body between the adjacent yarns in the vicinity of the bent point is likely to get out of the folded state, thereby causing the portion of the bent outer circumference to protrude partially. This is because the wrapping yarns near the bent point are shifted in the direction generally perpendicular to the axial direction of the airbag body, so that the yarns become parallel to the axial direction of the airbag body. Then the part of the airbag body protrudes from the space between the wrapping yarns. This protruded portion is likely to remain protruded even if the bending is returned thereafter, since the protruded portion comes to be clamped by the wrapping yarns.

Especially, if the intersection angle between the wrapping yarns in the wrapping area and the axial direction of the folded airbag body is less than 45°, the intersection angle with the airbag body axial direction is shallow. Accordingly, when the airbag body is bent at approximately 180°, the wrapping yarns near the bent point are easily shifted in the direction generally perpendicular to the axial direction of the airbag body, so that the yarns may become parallel to the axial direction of the airbag body. Then a big protruded portion is formed in the portion between the wrapping yarns. As a result, when the wrapped airbag body is housed in a vehicle, the airbag body cannot be smoothly housed in a predetermined housing portion since the protruded portion engages surrounding members. Here, the intersection angle is less than 90°.

If more than six wrapping yarns are used, many yarns remain untorn and help keep the airbag body in a folded state even when one wrapping yarn is torn.

Moreover, it is desired that the extension of the wrapping yarns according to JIS L 1013.7.5 be set within the range of 10 to 30%.

If the extension is less than 10%, the extension is small. With the small extension, many of the yarns are torn when the wrapped airbag body is bent, thereby allowing the airbag body to get out of the folded state. If the extension is 10% or more, less yarns are torn when the wrapped airbag body is bent. Then the wrapped airbag body can be handled in a bent and compact state, without collapsing the folded configuration, thereby facilitating the transfer and control until being mounted on a vehicle.

If the extension exceeds 30%, on the contrary, the extension is too big. With the big extension, a plurality of wrapping yarns are liable to stretch and gather when the airbag body expands and inflates. Then the wrapping yarns partially get together like one string of yarn and obstruct the expansion of the airbag body at the portion, which delays the expansion and inflation of the airbag as a whole.

Moreover, when the airbag body is provided at the upper edge thereof in the wrapping area with mounting portions for mounting the airbag body on a vehicle, the winding pitch of the wrapping yarns in the vicinity of the mounting portions may be widened compared with other portions. With this construction, the mounting portions can be taken out easily after the wrapping work, since they are not held tightly by the wrapping yarns.

The second airbag according to the present invention comprises an airbag body and a tearable wrapping member for keeping the airbag body in the folded state. The airbag body is folded and housed in the opening peripheral edge at the interior side of a vehicular body. The airbag body is wrapped by a wrapping member after being folded in such a manner as to expand and inflate to cover the opening when the inflation gas flows thereinto. The wrapping member is constructed of a plurality of wrapping yarns which braid-wrap the airbag body as folded into a generally rod-like shape, along the airbag body's axial direction, and in a manner to obliquely intersect the axial direction. The airbag body includes a wrapping area which is wound by the wrapping yarns in a braiding fashion, and is prevented from getting out of the folded up configuration. The wrapping area has a tied portion which is formed by winding the wrapping yarns braiding at the ends of the wrapping area without moving the yarns in the axial direction of said airbag body, for preventing the wrapping yarns from loosening.

In the second airbag of the present invention, too, a plurality of wrapping yarns constituting the wrapping member are not arranged intermittently, but wound around the folded and generally rod-shaped airbag body in a braiding fashion, along the axial direction of the airbag body, and in a manner to intersect the axial direction of the airbag body obliquely, in the wrapping area of the airbag body.

In this braid-wrapping, a plurality of wrapping yarns are divided into two groups, and the yarns of the individual groups wind the folded airbag body from the opposite directions to each other. Moreover, one yarn disposed over the other yarn on the outer circumference of the airbag body at an intersection of the wrapping yarns, is alternately disposed below the other yarn at another intersection on the extension line of the same yarn along the axial direction of the airbag body. Further at yet another intersection, the yarn holds another yarn. In the braid-wrapping, the holding and held states are thus repeated.

In the second airbag of the present invention, therefore, most part of the outer circumferential sides around the axis of the airbag body in the wrapping area are held by the wrapping yarns at more than one portion. As a result, in the wrapping area, the compactly folded state of the airbag body is kept uniformly along the axial direction of the airbag body, as in the first airbag. Specifically, even with only two wrapping yarns, those yarns are wound around the folded airbag body in the opposite directions. In this case, two yarns hold the outer circumferential side around the airbag body only at one position by their intersection. However, in the portion between the intersections apart from the intersection, two yarns are separated from each other to hold the outer circumferential side of the airbag body. Therefore, the airbag body is wrapped compactly in the wrapping area.

The wrapping work is simply done by winding the wrapping yarns in a braiding fashion around the airbag body so that the wrapping yarns may intersect the axial direction of the airbag body obliquely. Therefore, the wrapping work can be done easily by utilizing a device similar to a braiding machine used in forming a braided layer of a reinforced hose having a braided layer, for example.

At the end of the wrapping area, moreover, the wrapping yarns are prevented from loosening by a tied portion which is formed by winding and tying the wrapping yarns braiding without moving the wrapping yarns in the axial direction of the folded airbag body. Additional treatments such as retaining with a tape member are not necessary with respect to the end treatment of the wrapping yarns at the end portions of the wrapping area. Therefore, the end treatment of the wrapping yarns can be made easily.

Especially in the second airbag of the present invention, the wrapping yarns in plurality wrap the airbag in a braiding fashion. In this braiding fashion, as afore-described, a wrapping yarn holds the other yarn at an intersection, and is held by another yarn at another intersection along the axial direction of the folded airbag body. Therefore, if the wrapping yarns are wound around the airbag body once or more with the transfer merely stopped, without moving the winding position, the yarns hold and bind one another to form a tied portion easily for preventing the individual yarns from loosening.

In the second airbag of the present invention, therefore, the airbag body in the wrapping area is kept in a compact shape by a simple wrapping work, and the end treatment at the end portion of the wrapping area, for preventing the loosening of the wrapping yarns, is made easily. Therefore, the airbag wrapped can be manufactured with less work and at low cost.

Of course, if the wrapping yarns are braid-wrapped twice or more at the tied portion, the yarns are further tied tightly one another.

When the airbag body includes at least two front and rear wrapping areas as separated longitudinally, and is provided with the tied portions at the adjacent end portions of the front and rear wrapping areas, the wrapping yarns may be connected along the axial direction of the folded airbag body, in the portion of the airbag body between the adjacent tied portions of the front and rear wrapping areas. With this construction, the following working-effects are obtained.

If the airbag body includes more than one wrapping areas, specifically, the braiding work can be done without cutting the wrapping yarns, but with the yarns connected, between the adjacent tied portions of the wrapping areas. Therefore, the wrapping work can be done efficiently in each of the wrapping areas. At this time, there is no need to wind the wrapping yarns around the folded airbag body at the portion between the tied portions of the adjacent wrapping areas. Instead, the airbag body has only to be moved forward. Therefore, a plurality of wrapping areas are wrapped easily.

In this case, a joint mouth portion may be provided in the portion of the airbag body between the front and rear wrapping areas as separated longitudinally. The joint mouth portion is to be connected to the inflator for supplying the inflation gas, and to introduce the same into the airbag body.

With this construction, at the portion of the airbag body between the front and rear wrapping areas as separated longitudinally, the wrapping yarns in plurality are merely extended along the axial direction of the folded airbag body. Therefore, the joint mouth portion can be easily extracted from the gap between the predetermined wrapping yarns, to be connected to the inflator smoothly.

Of course, a mounting portion may be provided at the portion of the airbag body between the front and rear wrapping areas as separated longitudinally for mounting the airbag body on a vehicular body. With this construction, a mounting portion can be mounted on a vehicular body easily.

Furthermore, a tearable tape member may be wound around the tied portions at the front and rear ends of the airbag body. With this construction, although it is anticipated that the vicinity of the end side tied portions at the front and rear end side of the airbag body may loosen in relation with surrounding members in the course of handling such as the transfer, the tape member prevents the loosening of the wrapping yarns. Even if the tearable tape member is wound around these portions, the working-effects of the present invention are not remarkably decreased compared with the conventional wrapping manner of winding tape material intermittently, since the number of the winding portions is reduced.

BRIEF DESCRIPTION OF DRAWINGS

FIG. 5 is a front view of an airbag assembly of the embodiment.

FIG. 12 shows a wrapping process of the airbag of the embodiment.

FIG. 13 shows a wrapping process of the airbag of the embodiment, and shows the state after FIG. 12.

FIG. 18 shows a modification of the airbag of the embodiment.

DESCRIPTION OF THE PREFERRED EMBODIMENTS

Figure 1:
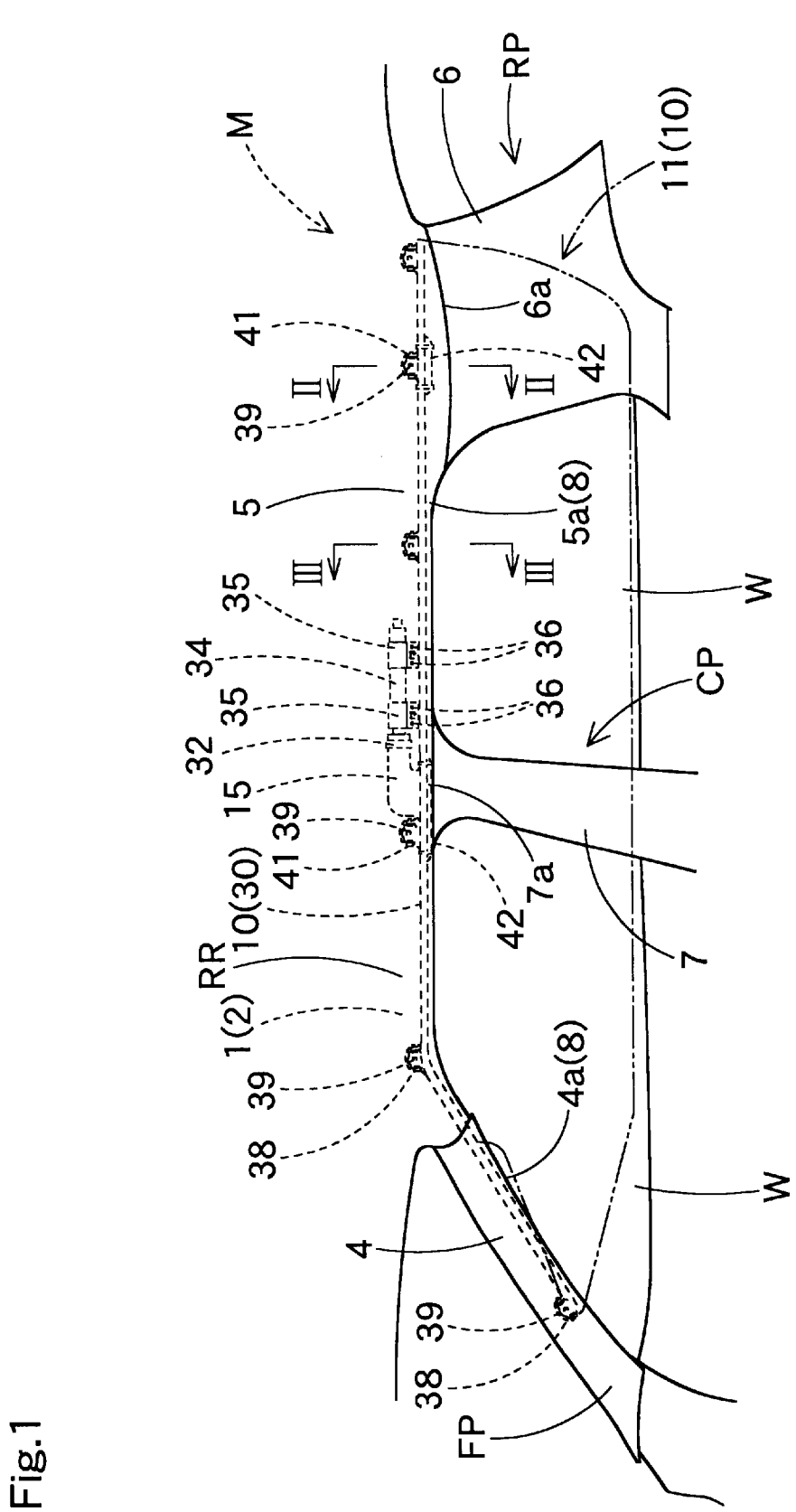
FIG. 1 is a front view of a head protecting airbag device for which an airbag of one embodiment of the present invention is used, as viewed from the vehicle's inner side.

The invention will be described below byway of embodiments shown in the drawings. In addition, the invention is not limited to the embodiments. All modifications within the requirements of the claims and equivalents with respect to the requirements should be included in the scope of the claims.

Figure 2:
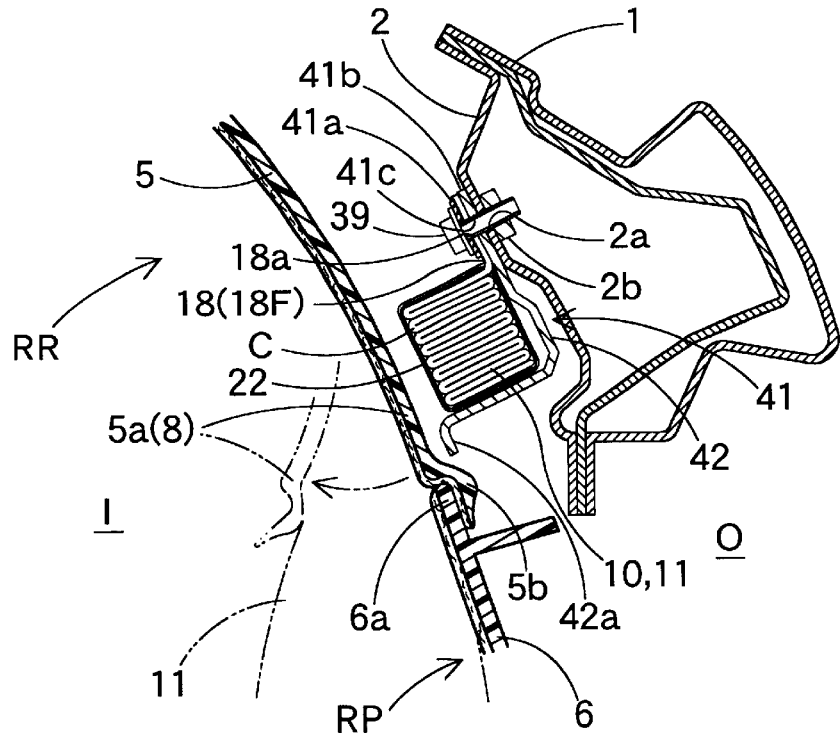
FIG. 2 is a schematic enlarged section taken along the line II—II of FIG. 1.
Figure 3:
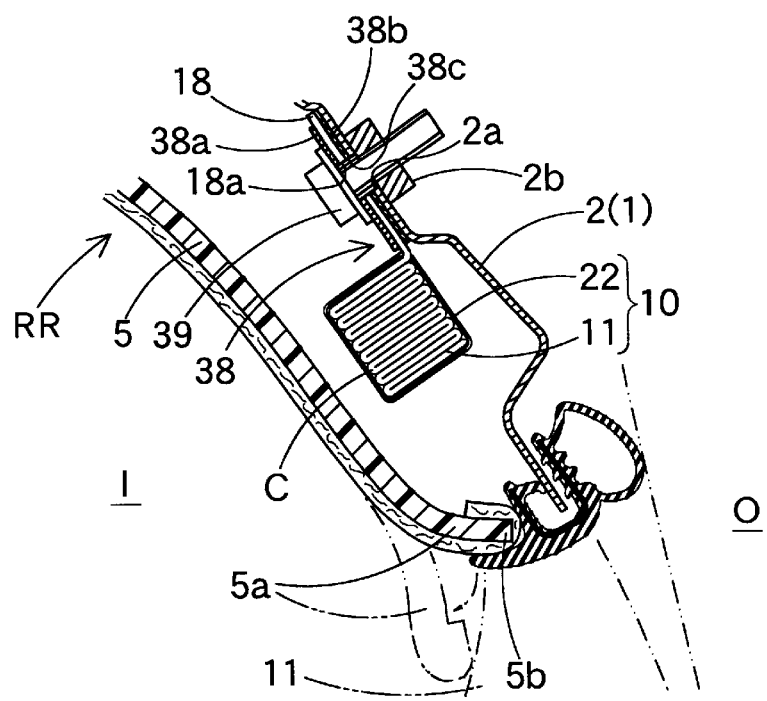
FIG. 3 is a schematic enlarged section taken along the line III—III of FIG. 1.

An airbag 10 of an embodiment is used in a head protecting airbag device M to be mounted on a vehicle, as shown in FIGS. 1 to 3. In this airbag 10, the airbag body 11 is wrapped by the wrapping member 22 and kept in the folded state. In this state, the airbag 10 is arranged over the front pillar FP, the roof side rail RR and the rear pillar RP, or in the upper peripheral edge of the opening W of doors and windows inside of the vehicle body 1.

The head protecting airbag device M is constructed to include the airbag 10, an inflator 34, mounting brackets 35, 38 and 41, and an airbag cover 8.

The inflator 34 of a cylinder type feeds the folded airbag 10 with inflation gas, as shown in FIGS. 1 and 5. Around the leading end (or the front end) of the inflator 34, there is fitted a joint mouth portion 15 of the gas inlet portion 12 of the airbag 10 (or the airbag body 11). The joint mouth portion 15 is connected thereto by means of a clamp 32.

The inflator 34 is attached to the body 1 at the vehicle's inner side of the rear pillar RP by means of two generally cylindrical mounting brackets 35 made of a sheet metal. Each of the mounting brackets 35 is constructed to clamp the inflator 34 and is attached to an inner panel 2 of a sheet metal on the side of the body 1, by two mounting bolts 36.

The airbag cover 8 includes a lid 4a on the lower edge side of the pillar garnish 4 arranged at the front pillar portion FP, and a lid 5a on the lower edge side of the roof head lining 5 arranged at the roof side rail portion RR.

As shown in FIGS. 1 to 3, the roof head lining 5 is made of a synthetic resin, and is attached to the inner panel 2 of the body 1 in the vehicle's inner side I of the roof side rail RR by a not-shown mounting means. The lid 5a on the lower edge side of the roof head lining 5 so opens at the lower end side 5b toward the vehicle's inner side I as to protrude the airbag body 11 expanded and inflated. As shown in FIGS. 1 and 2, the lower end 5b of the lid 5a intrudes to the vehicle's outer side O of the upper ends 6a and 7a of the rear pillar garnish 6 and the center pillar garnish 7, at the rear pillar portion RP and the center pillar portion CP. The lid lower end 5b is thus retained by those upper ends 6a and 7a.

The front pillar garnish 4 is also made of a synthetic resin, and is attached to the inner panel 2 of the body 1 in the vehicle's inner side of the front pillar portion FP. The lid 4a of the garnish 4 also opens toward the vehicle's inner side I so as to protrude the airbag body 11, when it expands and inflates.

Figure 4:
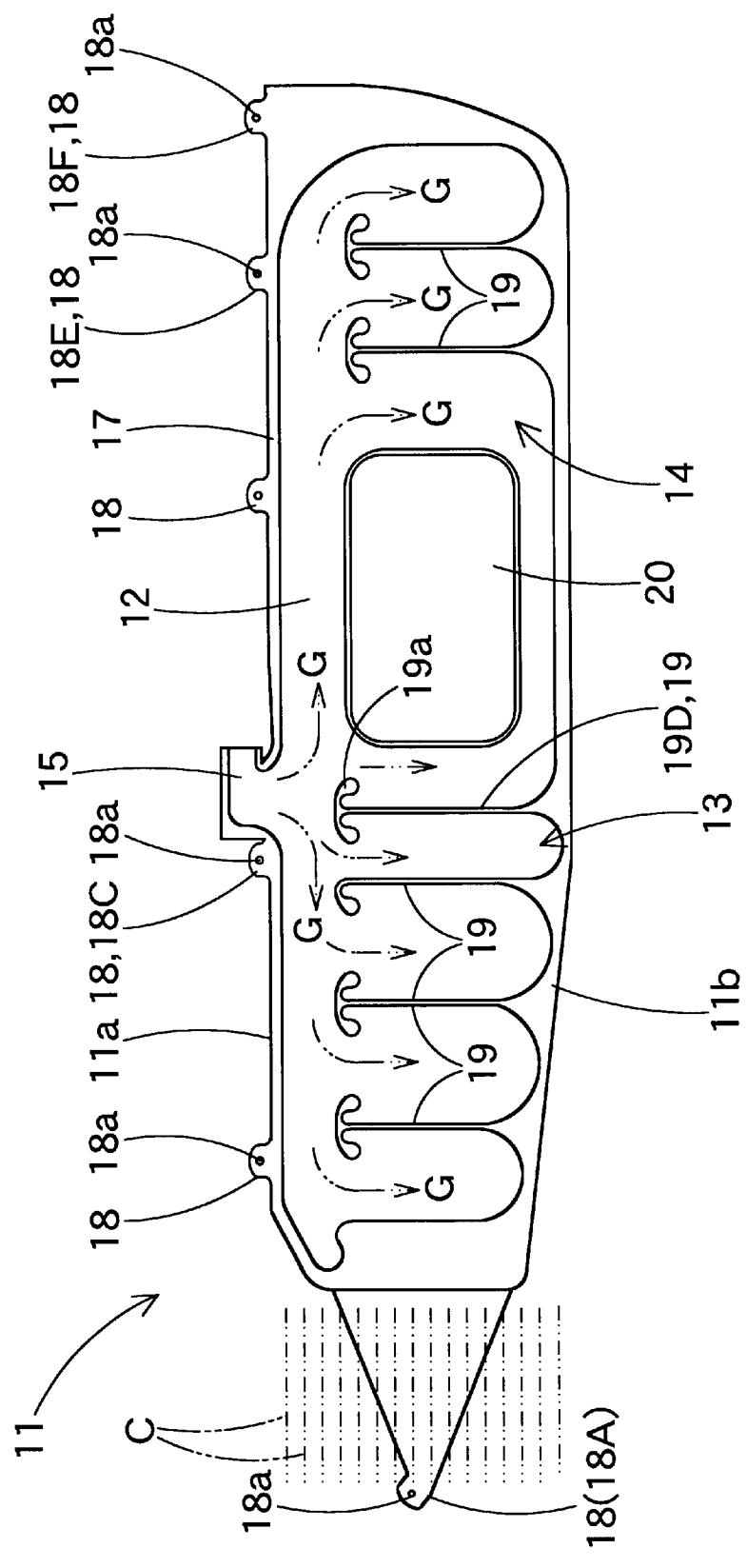
FIG. 4 is a front view of an airbag body used for the embodiment in an expanded and non-inflated state.

The airbag 10 is constructed, as shown in FIGS. 1, 4 and 5, to include the airbag body 11 and a tearable wrapping member 22 for keeping the folded shape of the airbag body. The airbag body 11 is hollow-woven of polyamide thread or the like into a flexible bag shape. The airbag body 11 thus formed is coated by silicone or the like on the outer surface side, so as to improve its heat resistance property.

The airbag body 11 includes a gas inlet portion 12 which admits the inflation gas from the inflator 34 therein, and a non-inlet portion 17 which admits no inflation gas, as shown in FIG. 4.

The gas inlet portion 12 comprises a front inflatable portion 13, a rear inflatable portion 14 and the joint mouth portion 15. The front inflatable portion 13 expands and inflates at the vehicle's outer side of the front seat, and the rear inflatable portion 14 expands and inflates at the vehicle's outer side of the rear seat. The joint mouth portion 15 has a generally tubular shape, and extends rearward from the upper edge position generally of the longitudinal center of the airbag body 11, or the upper edge side position between the front inflatable portion 13 and the rear inflatable portion 14. The joint mouth portion 15 is so opened at the rear end as to send the inflation gas from the inflator 34 into the gas inlet portion 12.

The non-inlet portion 17 is arranged around the gas inlet portion 12. At the upper edge side of the non-inlet portion 17, there are arranged a plurality of mounting portions 18 for attaching the airbag body 11 to the inner panel 2 of the body 1. The non-inlet portion 17 includes a controlling portion 19 arranged within the region of the front inflatable portion 13 and the rear inflatable portion 14, and a plate-shaped portion 20.

The controlling portion 19 is arranged to joint the vehicle's inner side wall and the outer side wall of the airbag in the gas inlet portion 12. The controlling portion 19 is provided for uniforming the thicknesses of the front and rear inflatable portions 13 and 14, and for generating tension in the inflated airbag body 11 along the vehicle's longitudinal direction from the front end side mounting portion 18A to the rear end side mounting portion 18F.

The plate-shaped portion 20 is arranged in a rectangular plate shape between the front and rear inflatable portions 13 and 14, for joining the vehicle's inner side wall and the outer side wall of the airbag in the gas inlet portion 12. This plate-shaped portion 20 is provided for decreasing the capacity of the gas inlet portion 12, thereby shortening the time period from the start to the completion of the inflation of the airbag body 11.

Here will be described the flow of the inflation gas G within the airbag body 11. As shown in FIG. 4, the inflation gas G flowing into the gas inlet portion 12 from the joint mouth portion 15 mounted around the inflator 34, bumps against the upper transverse rod portion 19a of the controlling portion 19D, and diverges in the front and rear sides. Subsequently, the gas thus diverged flows to the lower side of the front and rear inflatable portions 13 and 14 from the upper side, respectively, and the front and rear inflatable portions 13 and 14 inflate as a whole, thereby completing the inflation of the airbag body 11.

Each of the mounting portions 18 is provided at its center with a mounting hole 18a, and a mounting bolt 39 (refer to FIGS. 2 and 3) is inserted therethrough. Each of the mounting hole 18a is formed by boring after the hollow-weaving of the airbag body 11.

To each of the mounting portions 18 except the mounting portions 18E and 18C positioned above the rear pillar RP and the center pillar CP, respectively, there is fixed a mounting bracket 38, as shown in FIGS. 1, 3 and 5. The bracket 38 is used to attach the folded airbag body 11 tightly to the inner panel 2 on the side of the body 1. Each of the mounting brackets 38 is made of a sheet metal, and includes an inner plate 38a on the vehicle's inner side I and an outer plate 38b on the vehicle's outer side O. The inner and outer plates 38a and 38b are provided with mounting holes 38c corresponding to the mounting holes 18a of the mounting portion 18.

As shown in FIG. 3, each of the mounting portions 18 is attached to the inner panel 2 by means of the mounting bolt 39 and the bracket 38. Each bolt 39 is inserted through the mounting holes 38c and 18a to be fastened into a nut 2b fixed at the peripheral edge of the mounting hole 2a of the inner panel 2.

The mounting brackets 41 are arranged, as shown in FIGS. 2 and 5, at the upper side of the garnishes 6 and 7 on the inner side I of the rear pillar portion RP and the center pillar portion CP. The individual brackets 41 clamp each of the mounting portions 18E and 18C of the airbag body 11, and includes an inner plate 41a on the vehicle's inner side I and an outer plate 41b on the vehicle's outer side O, as the bracket 38. The inner and outer plates 41a and 41b are provided with mounting holes 41c corresponding to the mounting holes 18a of the mounting portions 18E and 18C.

Moreover, each of the outer plates 41b has a regulating portion 42. Each of the regulating portions 42 is provided for preventing the airbag body 11 from intruding into the vehicle's outer side O of the garnishes 6 or 7 at the initial stage of expansion and inflation of the airbag body 11. Each of the regulating portions 42 has a generally L-shaped section with a portion to support the lower side face of the folded airbag 10 and a portion to support the vehicle's outer side face. In the embodiment, each of the regulating portions 42 is provided at its vehicle's inner side end with an extension portion 42a directed downward (refer to FIGS. 2 and 8).

The wrapping member 22 is constructed of a plurality of wrapping yarns 22 formed of polyester, polyamide, urethane or the like. Six wrapping yarns 22 of yarn count 30, each of which is formed by twisting long filaments of polyester, are used in the embodiment. The wrapping yarn 22 of the embodiment has the yarn strength according to JIS L 1013.7.5 set to 28 to 35 N within the range of 7.4 to 65 N, and the extension according to JIS L 1013.7.5 set to 12 to 28% within the range of 10 to 30%.

Moreover, each of the wrapping yarns 22 is wound around the wrapping area 27 of the airbag body 11 folded into a generally rod-shape (as will be called "the folded airbag body 26" or "the folded body 26") helically, as shown in FIGS. 5 and 9 to 11, along the axial direction X of the folded airbag body 26, in a manner to intersect the axial direction X obliquely. In the embodiment, the wrapping area 27 is arranged in an area except the vicinity of the joint mouth portion 15 and the front and rear ends of the airbag body 11. In other words, the wrapping area 27 is composed of two of the front and rear areas 27A and 27B in the gas inlet portion 12 arranged from the front end side to the rear side of the body 26.

In the wrapping areas 27A and 27B of the embodiment, 6 yarns 22 in total of three yarns 23 (23A, 23B and 23C) and three yarns 24 (24A, 24B and 24C) wrap the folded body 26. The individual yarns 23 (23A, 23B and 23C) wind around the body 26 from the rear end of the body 26, counterclockwise at a predetermined pitch P1, toward the front end. The individual yarns 24 (24A, 24B and 24C) wind around the body 26 clockwise at a predetermined pitch P2, toward the front end. These two groups 23 and 24 of three yarns so wind around the outer circumference of the folded body 26 as to intersect each other.

Moreover, the wrapping yarns 23 and 24 so wrap the body 26 that either the wrapping yarn 23 or the wrapping yarn 24 being disposed over the other at an intersection of the wrapping yarns 23 and 24 on the outer surface of the body 26 may alternate in adjacent intersections. In other words, in the embodiment, six yarns 22 in total of two groups of three yarns are wound around the body 26 in a braiding manner just as a reinforced hose having a braided layer is braided with reinforcing yarns when forming a braided layer. More specifically, with this braid-wrapping, at a certain intersection from the front end to the rear end of the body 26, for example, if one wrapping yarn 23A is disposed over the wrapping yarn 24A on the outer surface of the body 26 so as to hold the wrapping yarn 24A, the wrapping yarn 24B is disposed over the wrapping yarn 23A so as to hold the same at the following intersection. Further at the following intersection, the wrapping yarn 23A is disposed over the wrapping yarn 24C so as to hold the wrapping yarn 24C, as shown in FIG. 11.

Figure 9:
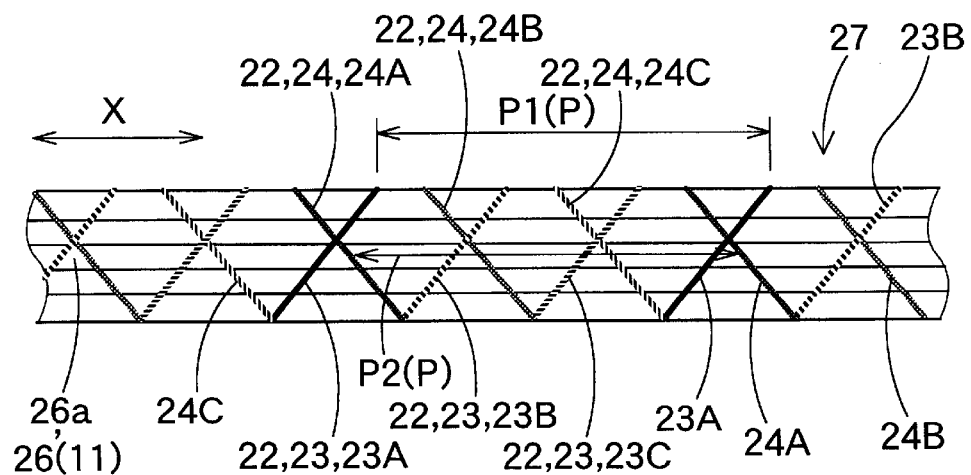
FIG. 9 is a partial front view of the wrapped airbag of the embodiment.
Figure 10:
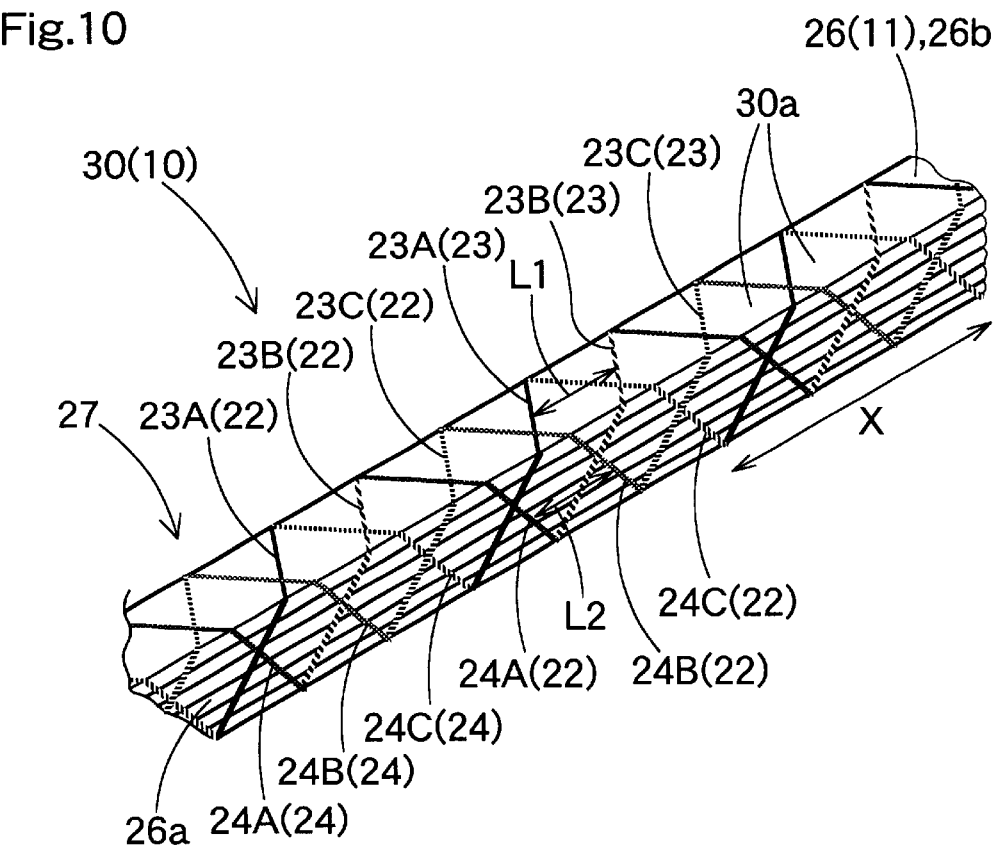
FIG. 10 is a partial perspective view of the wrapped airbag of the embodiment.
Figure 11:
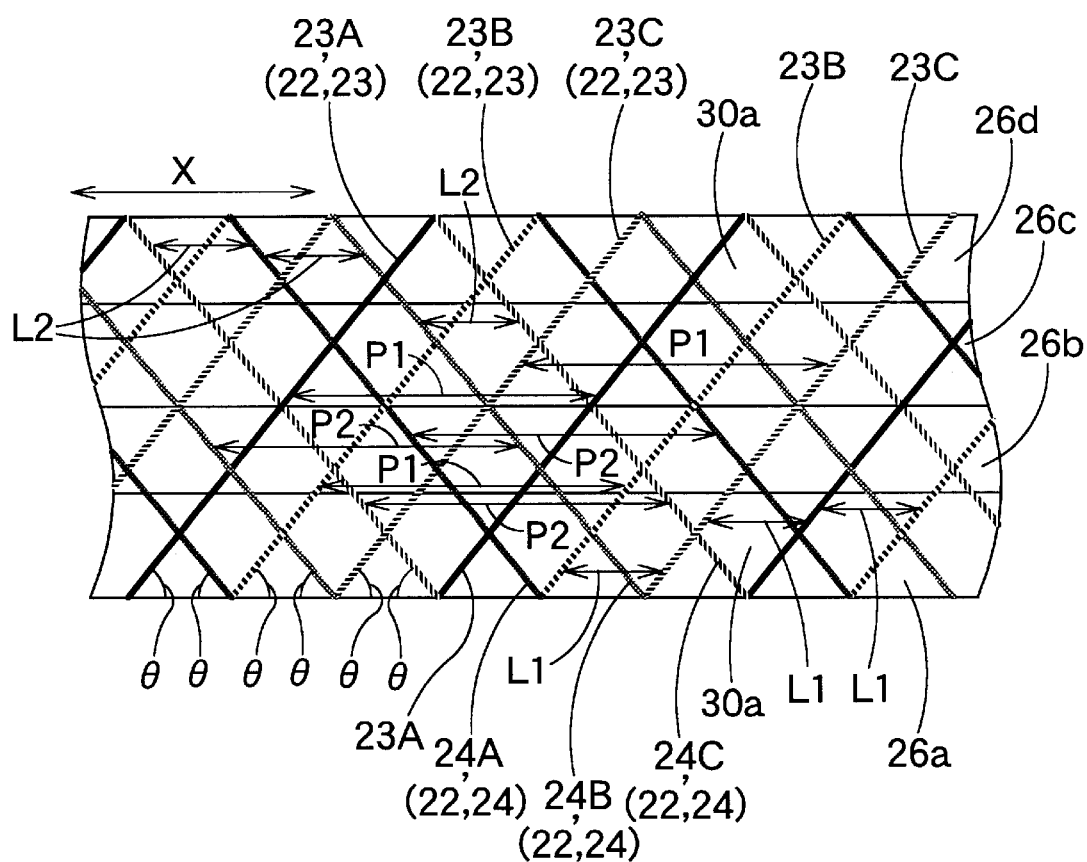
FIG. 11 is a development showing the airbag of the embodiment wrapped by the wrapping yarns.

As shown in FIGS. 9 and 11, the pitches P1 and P2 of winding the individual yarns 23A, 23B, 23C, 24A, 24B and 24C are both set to 90 mm in the wrapping area 27. The distance L1 between the yarns 23A, 23B and 23C wound in the same direction along the axial direction X of the body 26, and the distance L2 between the yarns 24A, 24B and 24C wound in the same direction along the axial direction X of the body 26 are both set to 30 mm. Moreover, the intersection angle θ between the individual yarns 22 and the axial direction X of the folded airbag body 26 is about 51°, which is greater than 45°.

FIG. 11 shows the wrapping state of the individual yarns 23A, 23B, 23C, 24A, 24B and 24C on the development of the outer circumference of the folded airbag body 26. The portion designated by the reference numeral 26a is the front side of the vehicle's interior side of the body 26, the portion designated by the numeral 26b is the upper side of the body 26, the portion designated by the numeral 26c is a back side of the body 26 or the vehicle's outer side, and the portion designated by the numeral 26c is a bottom side of the body 26.

As shown in FIG. 5, the above-described pitches P1, P2, the inter-yarn distances L1, L2, and the intersection angle θ are not maintained at the portion 28 in the vicinity of the joint mouth portion 15 in the folded body 26, i.e., at the portion 28 between the front and rear wrapping areas 27A and 27B. Instead, the individual yarns 23 and 24 are arranged generally along the axial direction X in the portion 28 so that the joint mouth portion 15 may be smoothly connected with the inflator 34. More specifically, if the joint mouth portion 15 is wrapped by the individual yarns 23 and 24 together with the airbag body 11, the joint mouth portion 15 cannot be extracted from the yarns 23 and 24 to be connected with the inflator 34, since the joint mouth portion 15 is extended in the longitudinal direction. Therefore, the individual yarns 23 and 24 are not wound at the portion 28 as in the same way as at other portions 27A and 27B.

Moreover, the individual yarns 23 and 24 form tied portions 29 formed by double-winding at the front end 27Aa of the wrapping area 27A, at the rear end 27Bb of the wrapping area 27B of the folded airbag body 26, and at the front and rear ends 28a and 28b of the above-described excluded portion 28. The tied portions 29 formed at the front and rear ends 27Aa and 27Bb of the wrapping areas 27A and 27B, respectively, constitute the end side tied portions 29a. The tied portions 29 formed at the front and rear ends 28a and 28b of the excluded portion 28 constitute the inner side tied portions 29b. Here, the front end 28a of the excluded portion 28 is identical to the rear end 27Ab of the front wrapping area 27A, and the rear end 28b of the excluded portion 28 is identical to the front end 27Ba of the rear wrapping area 27B.

Here will be described the assembly of the head protecting airbag device M of the embodiment. First of all, the airbag body 11 is folded up. When the airbag body 11 is folded up, it is folded in a bellows fashion generally in the vertical direction from a flat developed, non-inflated state, as shown in FIGS. 2 to 4. Specifically, the airbag body 11 is so folded in a bellows fashion that the side of the lower edge 11b approaches the upper edge 11a on folds C parallel to the upper edge 11a. After folding, the folded body 26 is wrapped by the wrapping yarns 22, thereby forming a wrapped airbag body 30.

In the embodiment, a predetermined folding device 52, as known in Japanese Patent Laid-Open No. Hei 11-43004, is used for the folding of the airbag body 11, and a wrapping device 54 connected to the folding device 52 is used for the wrapping work using the wrapping yarns 22, as shown in FIG. 12.

The wrapping device 54 is similar to a braiding machine which is used for forming a braided layer of a reinforced hose having a braided layer. The wrapping device 54 has a bobbin carrier 55 which rotates while holding six bobbins 56. The bobbin carrier 55 is provided at its center with a through hole 57 for inserting the folded body 26 through. The individual yarns 23A, 23B, 23C, 24A, 24B and 24C are wound around the individual bobbins 56.

Moreover, the wrapping device 54 includes a not-shown guide means for guiding the folded body 26 from the folding device 52 into the through hole 57 at the center of the bobbin carrier 55, a not-shown guide means for guiding the wrapped airbag body 30 (30A) wrapped by the wrapping yarns 22 and put out of the through hole 57, and a transfer means 59 for transferring the folded body 26 or the wrapped airbag body 30 forward. The transfer means 59 is provided with a transferring belt conveyer or a transferring roller 60 arranged at the side of the folding device 52, and a transferring belt conveyer or a transferring roller 61 arranged at the side of the bobbin carrier 55.

The wrapping device 54 has a position detective device 58 (refer to FIG. 13B). The position detective device 58 is provided with a measuring roller 58a for measuring the transfer distance of the airbag body 26 and a detective sensor 58b for detecting the reached position. This wrapping device 54 is so constructed to perform the wrapping work automatically except the winding of later-described tape members 44, 45 and 46, and the cutting work of the yarns 22.

In the wrapping work using the wrapping device 54, the folded bodies 26 folded by the folding device 52 are sequentially transferred through the through hole 57 by the transfer means 59. Then the bobbin carrier 55 rotates around the through hole 57 spooling off the wrapping yarns 22.

Figure 6:
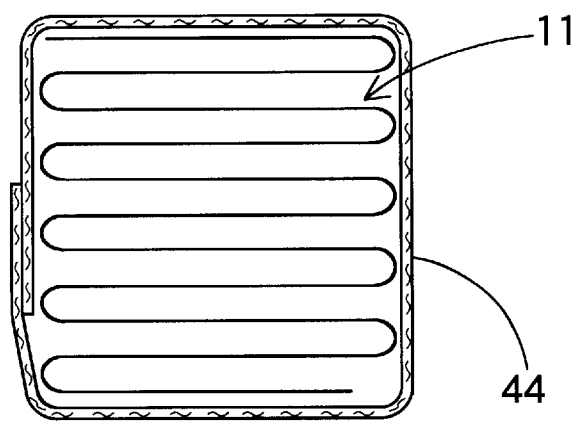
FIG. 6 is a schematic enlarged section taken along the line VI—VI of FIG. 5.
Figure 7:
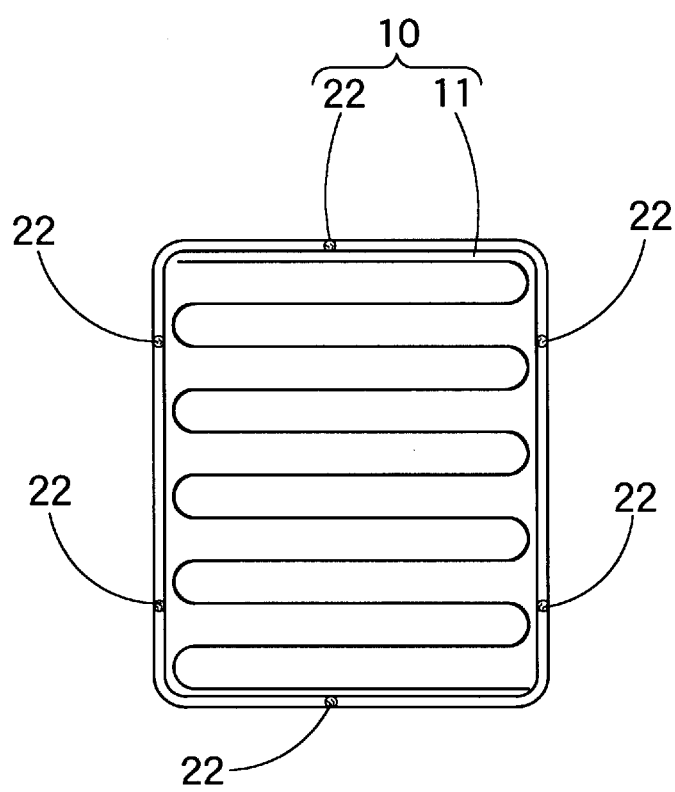
FIG. 7 is a schematic enlarged section taken along the line VII—VII of FIG. 5.

More specifically, when the folded body 26 is put out of the folding device 52, a tearable tape member 44 is wound around the vicinities of the front end and the rear end of the body 26 except the area of the gas inlet portion 12 (refer to FIGS. 5, 6 and 12). The tape member 44 is thus used since these areas are not wrapped by the wrapping yarns 22.

Then the folded bodies 26 are sequentially put through the through hole 57 of the bobbin carrier 55, and are wrapped by the wrapping yarns 22 while the transfer speed and the rotation of the bobbin carrier 55 are controlled.

As shown in FIG. 12A, when the front end 27Aa of the wrapping area 27A reaches the winding position 54a of the wrapping device 54, the transfer of the body 26 is stopped, and the six yarns 22 are wound therearound twice by rotating the bobbin carrier 55 twice to form the end side tied portion 29a.

Here, the individual yarns 22 wound around the front end 27Aa of the wrapping area 27A are not cut off but leads from the preceding wrapped body 30A (more specifically, from the end side tied portion 29a of the rear end 27Bb of the wrapping area 27B in the body 30A).

When the end side tied portion 29a is formed at the front end 27Aa of the wrapping area 27A, the body 26 is transferred forward at a predetermined speed, and the front wrapping area 27A of the body 26 is wrapped by the six yarns 22 spooled off from the rotating bobbin carrier 55 at the afore-described pitches P1 and P2 and the inter-yarn distance L1 and L2 (refer to FIG. 12B).

Thereafter, when the front end 28a of the excluded portion 28 of the folded body 26 (or the rear end 27Ab of the wrapping area 27A) reaches the winding position 54a of the wrapping device 54, as shown in FIG. 12B, the transfer of the body 26 is stopped, and six yarns 22 are wound therearound twice by rotating the bobbin carrier 55 twice to form the inner side tied portion 29b.

After forming the inner side tied portion 29b, the rotation of the bobbin carrier 55 is stopped, and the body 26 is merely transferred forward so that the individual yarns 22 may be just spooled off along the axial direction X of the body 26, instead of wrapping helically (refer to FIG. 13A).

Figure 23:
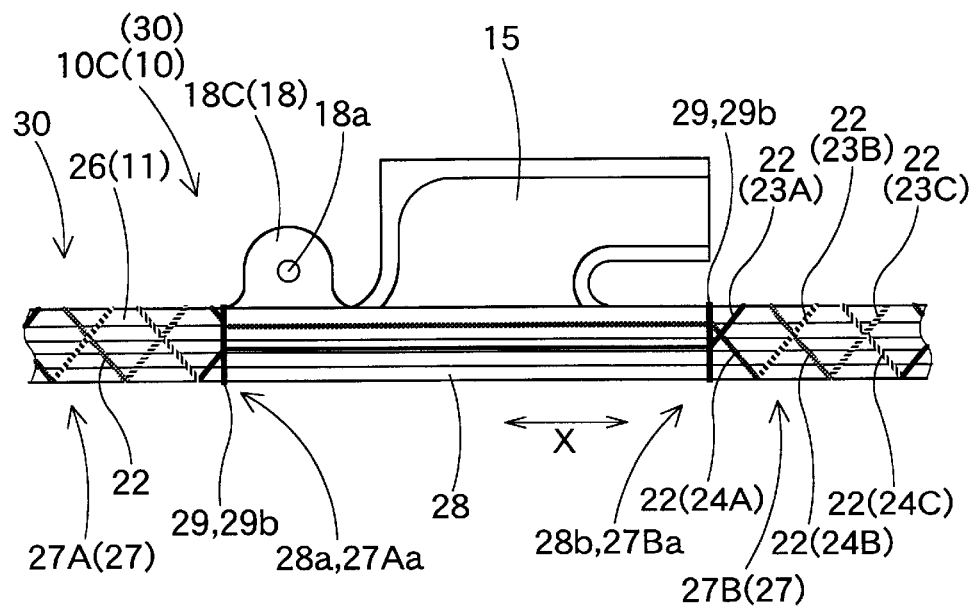
FIG. 23 is a partial front view of the vicinity of the joint mouth portion of the airbag in FIG. 19 which has been just wrapped.

Thereafter, when the rear end 28b of the excluded portion 28 of the folded body 26 (or the front end 27Ba of the wrapping area 27B) reaches the winding position 54a of the wrapping device 54, as shown in FIG. 13A, the transfer of the body 26 is stopped, and six yarns 22 are wound therearound twice by rotating the bobbin carrier 55 twice to form the inner side tied portion 29b. Thus the inner side tied portions 29b are formed at the front and rear ends 28a and 28b of the excluded portion 28, as shown in FIG. 23.

Subsequently, as the body 26 is transferred forward at a predetermined speed, the rear wrapping area 27B of the body 26 is wrapped by the six yarns 22 spooled off from the rotating bobbin carrier 55 at the afore-described pitches P1 and P2 and the inter-yarn distance L1 and L2 (refer to FIG. 13B).

Thereafter, when the rear end 27Bb of the rear wrapping area 27B of the folded body 26 reaches the winding position 54a of the wrapping device 54, as shown in FIG. 13B, the transfer of the body 26 is stopped, and six yarns 22 are wound therearound twice by rotating the bobbin carrier 55 twice to form the end side tied portion 29a.

Subsequently, the wrapping work is applied to the following folded airbag body 26 as afore-described, and thus the wrapped airbag bodies 30 are formed sequentially.

In the course of forming the wrapped airbag bodies 30 sequentially, a tearable tape member 45 is wrapped around the end side tied portion 29a of the front end side of the just wrapped airbag body 30 and around the end side tied portion 29a of the precedently wrapped airbag body 30A, for preventing the yarns 22 from fraying or loosening, as shown in FIG. 13B. Cutting the yarns 22 leading from the two end side tied portions 29a and 29a wound by the tape member 45, the individual wrapped airbag body 30 can be taken out.

Figure 8:
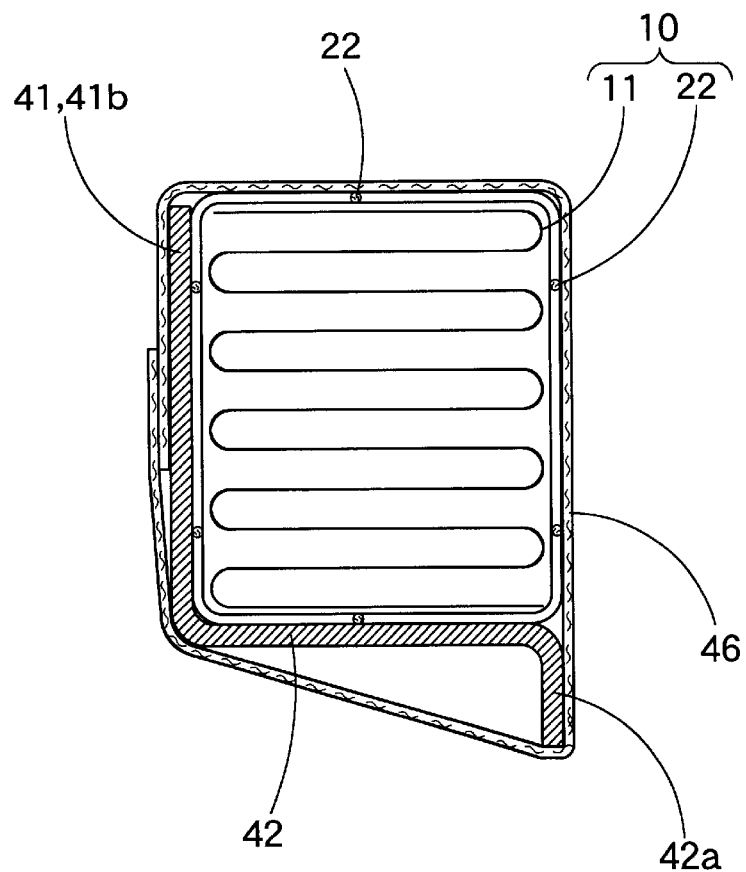
FIG. 8 is a schematic enlarged section taken along the line VIII—VIII of FIG. 5.

Thereafter, the individual mounting portions 18 of the wrapped airbag body 30 are taken out, and the predetermined mounting brackets 38 and 41 are attached to the mounting portions 18. Moreover, as shown in FIGS. 5 and 8, a tearable tape member 46 is so wound around the regulating portions 42 together with the airbag body 30 that the regulating portions 42 and the body 30 may not separate.

The inflator 34 is inserted into the joint mouth portion 15, and the clamp 32 is fitted around the joint mouth portion 15, thereby joining the joint mouth portion 15 and the inflator 34. As a result, an airbag assembly 50 is formed, as shown in FIG. 5. Here, the mounting brackets 35 and 35 have been attached in advance to the inflator 34.

Thereafter, the individual mounting brackets 35, 38, and 41 are placed at the predetermined positions of the inner panel 2, and are fixed thereto by the bolts 36 and 39 inserted through the individual mounting holes 18a, 38c and 41c. Thus the airbag assembly 50 is mounted on the body 1. Next, the front pillar garnish 4 and the roof head lining 5 are attached to the body 1, and the rear pillar garnish 6 and the center pillar garnish 7 are attached to the body 1. Thus the head protecting airbag device M is mounted on a vehicle.

When the inflator 34 is activated after the mounting of the device M on the vehicle, the inflation gas from the inflator 34 flows from the joint mouth portion 15 to the front and rear inflatable portions 13 and 14 of the gas inlet portion 12. Then the airbag body 11 starts to inflate as eliminating the folds, and breaks the wrapping yarns 22, tape members 44, 45 and 46. The airbag body 11 further pushes and opens the lids 4a and 5a of the front pillar garnish 4 and the roof head lining 5, and inflates largely enough to cover the opening W, as indicated by double-dotted lines in FIGS. 1 to 3.

In the airbag 10 of the embodiment, the wrapping yarns 22 constituting the wrapping member are not arranged intermittently along the axial direction X of the generally rod-shaped folded airbag body 26 in the wrapping areas 27A and 27B of the body 26. Specifically, in the airbag 10, the wrapping yarns 22 are wound around the body 26 in a braiding fashion so as to intersect the axial direction X of the airbag body 26 obliquely. Moreover, at least two wrapping yarns 23 and 24 out of the wrapping yarns 22 are wound around the folded airbag body 26 in adverse directions to each other.

Therefore, in the airbag 10, most part of the outer circumferential sides 26a, 26b, 26c and 26d around the axis of the airbag body 26 in the wrapping areas 27A and 27B are held by the wrapping yarns 22 at more than one portion (refer to FIG. 11). Especially in the embodiment, six yarns 22 (23A, 23B, 23C, 24A, 24B and 24C) are used. Therefore, the wrapping yarns 22 hold the outer circumferential sides of the airbag body 26 at three to six positions, including the intersections of the yarns 23 and 24. As a result, in the wrapping area 27, the compactly folded state of the airbag body 26 is further kept uniformly along the axial direction X of the airbag body 26.

Moreover, the wrapping work is simply done by winding the wrapping yarns 22 helically around the folded airbag body 26 so that the wrapping yarns 22 may intersect the axial direction X of the airbag body 26 obliquely. In other words, the wrapping work of the embodiment can be done easily by utilizing the wrapping device 54 similar to a braiding machine used in forming a braided layer of a reinforced hose having a braided layer.

Furthermore, the wrapping yarns 23 including the yarns 23A, 23B and 23C, or the wrapping yarns 24 including the yarns 24A, 24B, and 24C, both of which are wound in the same direction, are wound around the folded airbag body 26 while the distances L1 and L2 between the adjacent yarns along the body axial direction X are set to 30 mm, in the range of 20 to 60 mm. Moreover, the individual wrapping yarns 22 has the yarn strength according to JIS L 1013.7.5 set to 28 to 35 N, in the range of 7.4 to 65 N. As a result, the airbag body 11 of the embodiment is wrapped compactly without degrading the expanding property of the airbag 10.

Here, if the distances L1 and L2 between the adjacent yarns along the body axial direction X are set to less than 20 mm, the density of the wrapping yarns 22 per unit length along the axial direction X of the airbag body 26 becomes high. Then the resistance in breaking the wrapping yarns 22 becomes big when the airbag body 11 (or 26) breaks the individual wrapping yarns 22 to expand and inflate, which is likely to delay the expansion of the airbag body 11. On the contrary, if the distances L1 and L2 between the adjacent yarns exceeds 60 mm, the area of the airbag body 26 not held by the yarns enlarges, and therefore, the area is likely to bulge, which checks the effect of wrapping the airbag body 26 compactly.

Therefore, with respect to the wrapping yarns 23 and 24 wound in the same direction, the distances L1 and L2 between the adjacent yarns along the axial direction X of the folded airbag body 26 are desirably set within the range of 20 to 60 mm.

Moreover, if the yarn strength of the wrapping yarns 22 according to JIS L 1013.7.5 is less than 7.4 N, the wrapping yarns 22 are torn when the wrapped airbag body 30 is bent, and cannot wrap the airbag body 26 compactly any more. On the contrary, if the yarn strength of the wrapping yarns 22 according to JIS L 1013.7.5 is more than 65 N, the resistance in breaking the wrapping yarns 22 becomes big when the airbag body 11 (or 26) breaks the individual wrapping yarns 22 to expand and inflate, which delays the expansion of the airbag 10.

From this viewpoint, accordingly, the yarn strength of the wrapping yarns 22 according to JIS L 1013.7.5 is desirably set within the range of 7.4 to 65 N, and more desirably, within the range of 18.7 to 41 N.

Therefore, by a simple wrapping work, the airbag 10 of the embodiment is able to keep the airbag body 26 in the wrapping area 27 compact, while securing the smooth expansion and inflation. Moreover, the compact shape is kept even if the wrapped airbag body 30 is bent.

In the embodiment, the wrapping yarns 22 in the wrapping area 27 are wound around the folded airbag body 26 at an intersection angle of 51°, which is greater than 45°, with respect to the axial direction X of the airbag body 26. Therefore, the wrapped airbag body 30 is kept in the folded state even if it is bent.

Here, if the wrapped airbag 30 is bent at approximately 180°, for example, in the folded and overlapped direction and is returned, the portion 30a of the airbag body 30 between adjacent yarns in the vicinity of the bent point (refer to FIGS. 10 and 11) is likely to protrude partially at the outer side of the bent point, thereby collapsing the folded-up shape.

Especially, if the intersection angle between the wrapping yarns 22 in the wrapping area 27 and the axial direction X of the folded airbag body 26 is less than 45°, the intersection angle with the airbag body axial direction X is shallow. Accordingly, when the airbag body 30 is bent at approximately 180°, the wrapping yarns 22 near the bent point are easily shifted in the direction generally perpendicular to the axial direction X of the airbag body 26, so that the yarns 22 may become parallel to the axial direction X of the airbag body 26. Then a big protruded portion is formed in the portion 30a between the wrapping yarns 22 and 22. As a result, when the wrapped airbag body 30 is housed in a vehicle, the airbag body 11 cannot be smoothly housed in a predetermined housing portion since the protruded portion engages surrounding members.

With more than six wrapping yarns 22 as in the embodiment, even if a wrapping yarn 22 is torn, many yarns 22 remain untorn. Hence, the airbag body 26 is kept in the folded state by the remaining wrapping yarns 22.

In case six or more wrapping yarns 22 are used as in the embodiment, the winding pitch P of the individual yarns 22 is desirably set within the range of 80 to 100 mm. In the folded airbag body 26, the density of the wrapping yarns 22 per unit length along the axial direction X of the airbag body 26 becomes high with the pitch P (P1 and P2) less than 80 mm. Then the resistance in breaking the wrapping yarns 22 becomes big when the airbag body 11 (or 26) breaks the individual wrapping yarns 22 to expand and inflate, which is likely to delay the expansion of the airbag body 11. On the contrary, with the pitch P (P1 and P2) more than 100 mm in the folded airbag body 26, the intersection angle θ between the individual yarns 22 and the axial direction X of the folded airbag body 26 is likely to fall to less than 45°. Therefore, when bent and returned, the wrapped airbag body 30 may get out of the folded state.

Moreover, in the embodiment, the extension of the individual wrapping yarns 22 according to JIS L 1013.7.5 is set to 12 to 28%, within the range of 10 to 30%. Specifically, the extension is small if it is less than 10%. With the small extension, many of the yarns are torn when the wrapped airbag body 30 is bent, thereby allowing the airbag body 11 to get out of the folded state. If the extension is 10% or more, less yarns are torn when the wrapped airbag body 30 is bent. Then the wrapped airbag body 30 can be handled in a bent and compact state, without collapsing the folded-up configuration, to facilitate the transfer and control until being mounted on a vehicle.

On the contrary, the extension is too big if it exceeds 30%. With the big extension, a plurality of wrapping yarns 22 are liable to stretch and gather when the airbag body 11 expands and inflates. Then the wrapping yarns 22 get together like one string of yarn and obstruct the expansion of the airbag body 11 at the portion, which delays the expansion and inflation of the airbag 10 as a whole.

Therefore, it is desired that the extension of the individual wrapping yarns 22 according to JIS L 1013.7.5 is set within 10 to 30%.

In the embodiment, moreover, the wrapping yarns 23 and 24 so wraps the outer circumference of the folded airbag body 11 that the wrapping yarn 23 or the wrapping yarn 24 disposed over the other at an intersection of the wrapping yarns 23 and 24 on the outer surface of the airbag body 11 may alternate in adjacent intersections. In other words, the airbag body 11 is wrapped by the individual yarns 23 and 24 in a braiding manner. In this case, even if one wrapping yarn 23A is broken in the wrapped area, either one of other wrapping yarns 24A, 24B or 24C holds the broken wrapping yarn 23A at the adjacent sides interposing the broken portion. Accordingly, the broken wrapping yarn 23A is prevented from loosening over the entire length of the airbag body 11, and contributes to wrapping the airbag body 11, except the portion between the intersections interposing the broken portion.

In the airbag 10 of the embodiment, the folded body 26 is wrapped by the yarns 22 in a braiding manner. However, the body 26 may be wrapped by the yarns 22 in a spiral fashion. In the spiral fashion, the individual yarns 23 and 24 have a fixed array relationship on the outer circumference of the folded body 26, although they intersect each other so as to intersect the body axial direction X. In other words, if either one of the yarns 23 or 24 is disposed over the other, this relationship is maintained over the whole wrapping area. In this spiral wrapping, a tearable tape member 45 is desirably wound on the outer circumference of the tied portion 29, since the individual yarns 22 are easy to loosen at the tied portion 29.

Here, even if the tape member 45 is wound at these positions, the working-effects of the present invention are not remarkably decreased compared with the conventional wrapping manner of winding a tape member intermittently, since the number of winding portions is reduced.

In the embodiment, six wrapping yarns 23A, 23B, 23C, 24A, 24B and 24C are used to wrap the airbag body 26. However, two to five wrapping yarns 22 may be used to wrap the folded body 26 on condition that: the yarn strength according to JIS L 1013.7.5 is set within the range of 7.4 to 65N; the wrapping yarns divided into two groups are wound on the wrapping area 27 of the folded airbag body 26 in the opposite directions; and the distance between the adjacent yarns regarding the yarns wound in the same direction along the axial direction X of the folded body 26 is set within the range of 20 to 60 mm. In this case as well, the working-effects of the present invention are obtained.

Figure 14:
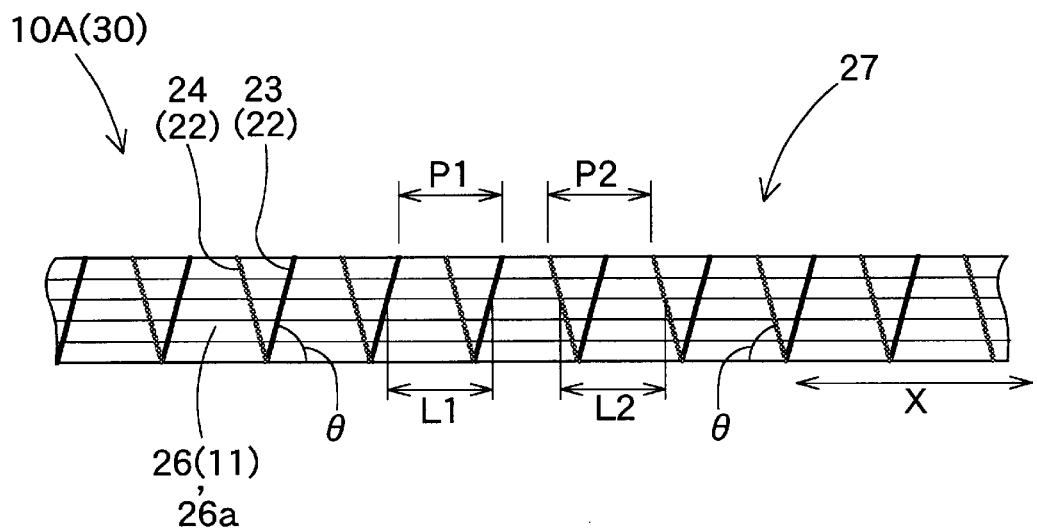
FIG. 14 is a partial front view of an airbag of another embodiment.
Figure 15:
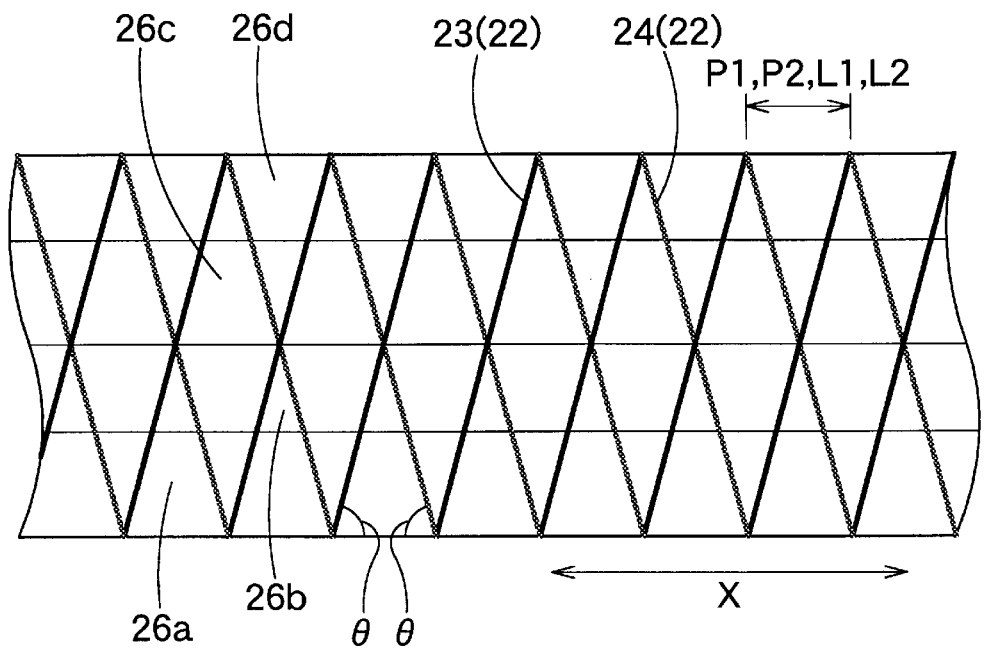
FIG. 15 is a development showing the airbag body in FIG. 14 wrapped by the wrapping yarns.

In the airbag 10A shown in FIGS. 14 and 15, for example, two wrapping yarns 23 and 24 are wound around the body 26 in the opposite directions to each other in the wrapping area 27. Here, the wrapping yarns 23 and 24 are the same yarns as the yarns 22 in the embodiment. With respect to the wrapping yarns 23 or 24 wound in the same direction, the inter-yarn distances L1 and L2 along the axial direction X of the folded body 26 are both set to 30 mm. The winding pitches P1 and P2 of the individual yarns 23 and 24 are set to 30 mm, which coincides with the inter-yarn distances L1 and L2. The intersection angles θ between the individual yarns 23 and 24 and the body axial direction X are both set to about 75°. The working-effects of the present invention are obtained with this wrapping manner. In this case, the inter-yarn distance L1 and the inter-yarn distance L2 may differ from each other, on condition that the both inter-yarn distances L1 and L2 are within the range of 20 to 60 mm.

Figure 16:
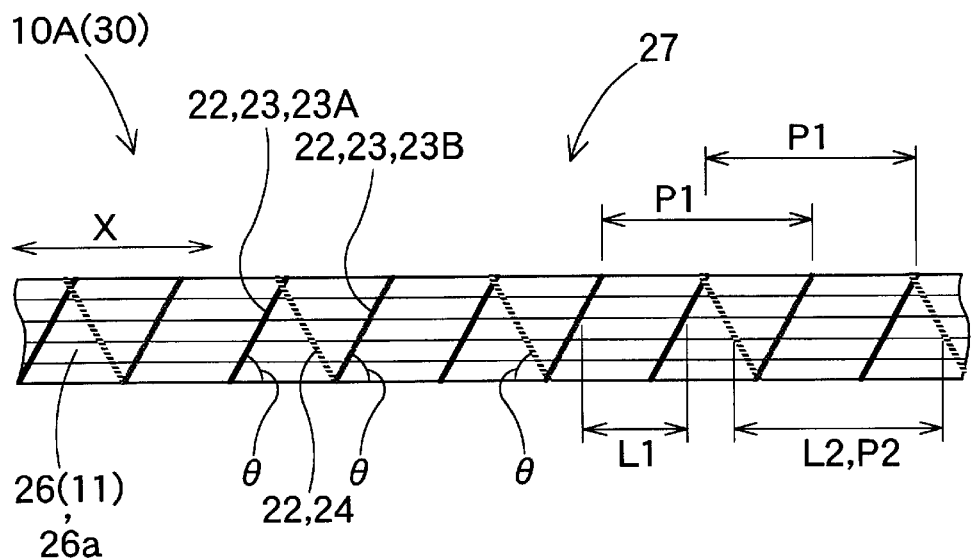
FIG. 16 is a partial front view of an airbag of still another embodiment.
Figure 17:
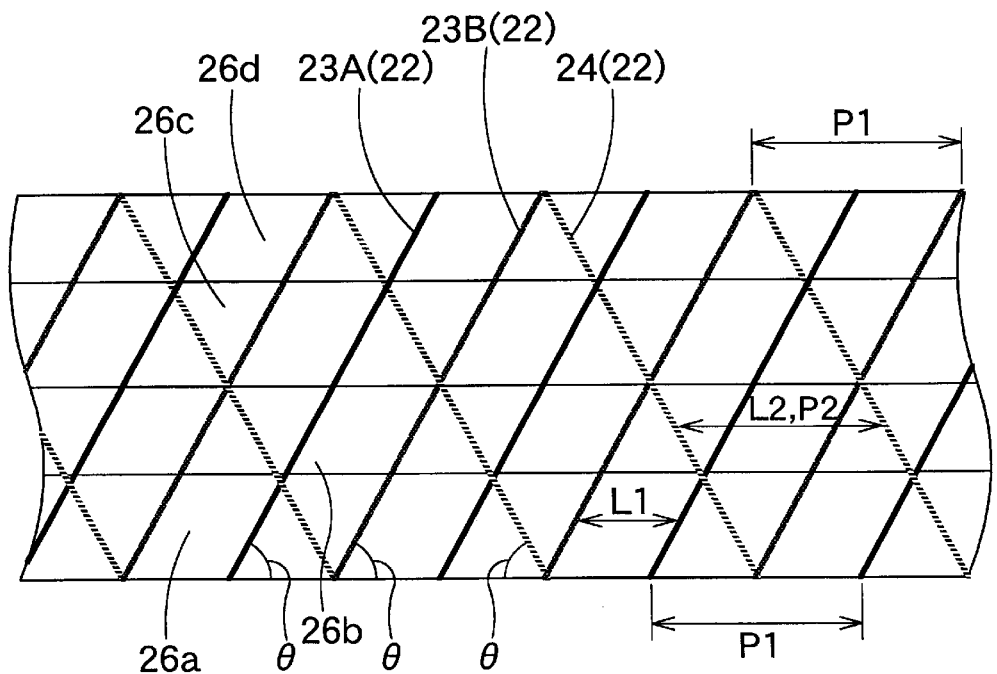
FIG. 17 is a development showing the airbag body in FIG. 16 wrapped by the wrapping yarns.

In the airbag 10B shown in FIGS. 16 and 17, alternatively, the folded body 26 is wrapped by two yarns 23A and 23B, and a yarn 24 in the wrapping area 27 from opposite directions. The individual yarns 23A, 23B and 24 are the same yarns as the wrapping yarns 22 of the embodiment. The inter-yarn distance L1 between the adjacent yarns with respect to the yarns 23A and 23B, which are wound in the same direction, along the axial direction X of the folded body 26 is set to 30 mm. Each of the winding pitch P1 of the yarns 23A and 23B is 60 mm, respectively, and the intersection angles θ between the individual yarns 23A and 23B and the body axial direction X are about 61°. The inter-yarn distance L2 of the yarn 24 along the axial direction X of the body 26 is 60 mm, which is the same as the winding pitch P2 of the yarn 24, and the intersection angle θ between the yarn 24 and the body axial direction X is about 61°. With this construction, the working-effects of the present invention are obtained as well.

In the embodiment, moreover, the individual yarns 22 (23A, 23B, 23C, 24A, 24B and 24C) are wound around the body 26 at the uniform pitches P1, P2 and the uniform inter-yarn distances L1 and L2 over the whole wrapping area 27. Accordingly, as indicated by double-dotted lines in FIG. 18A, there arises a case in which a mounting portion 18 of the airbag body 11 cannot be taken out easily since it is tightly held by a plurality of yarns such as 23C and 24B. In this case, the winding pitch of the yarns 22 may be widened in the vicinity of the mounting portion 18 which is not easily taken out, for easier extraction of the mounting portion 18. This changed-pitch portion PV is formed partially to have a longer pitch by accelerating the transfer speed of the folded body 26 relative to the rotation speed of the bobbin carrier 55 (either by accelerating only the transfer speed, or only slowing down the rotation of the bobbin carrier).

In this case, alternatively, the yarns 23C and 24B positioned on the mounting portion 18 shown in FIG. 18A may be broken to take out the mounting portion 18 if the yarns 23C and 24B are held at nearby intersections so as not to loosen.

Figure 19A:
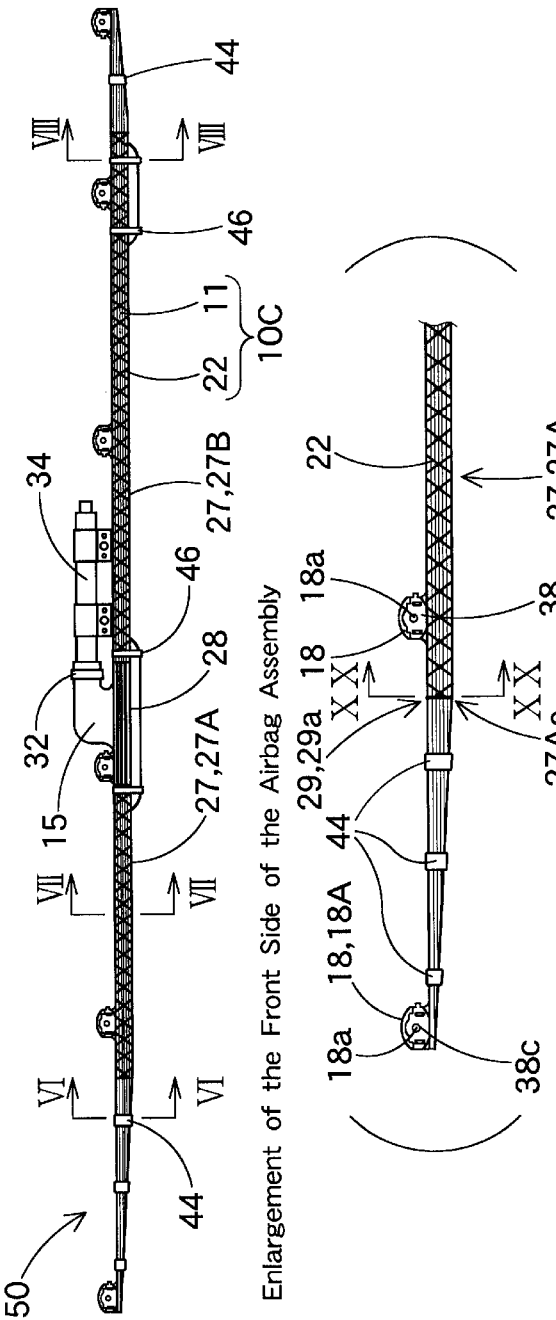
FIG. 19 is a front view of an airbag assembly utilizing an airbag of still another modification of the embodiment.
Figure 19B:
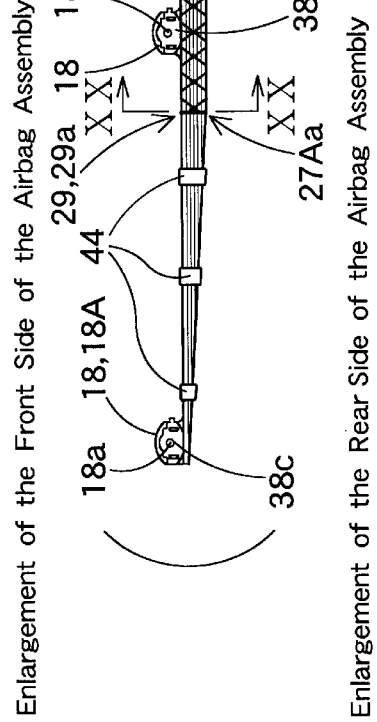
Figure 19C:
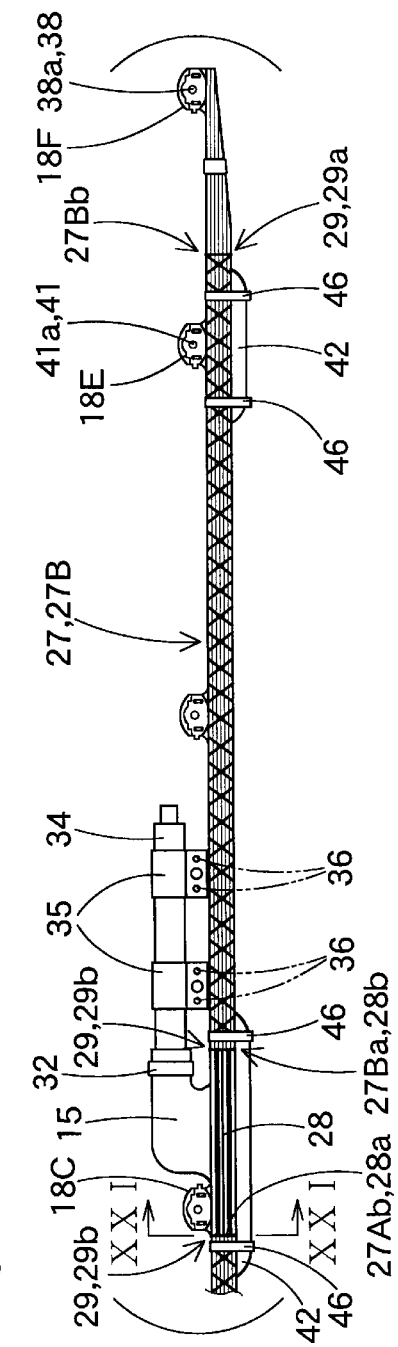

In the airbag 10 of the embodiment, the braiding wrapping yarns 22 are merely bound at the end portions 27Aa, 27Ab, 27Ba and 27Bb of the wrapping areas 27A and 27B, without moving the wrapping yarns 22 in the axial direction X of the folded airbag body 26. In other words, the tied portions 29, which are tied after braiding, are formed at the end portions 27Aa, 27Ab, 27Ba and 27Bb, for preventing the individual yarns 22 from loosening. As in the airbag 10C shown in FIG. 19, therefore, additional treatments such as retaining with a tape member 45 are not necessary with respect to the end treatment of the wrapping yarns 22 at the end portions 27Aa, 27Ab, 27Ba and 27Bb of the wrapping areas 27A and 27B. In the airbag 10c, therefore, the end treatment of the wrapping yarns 22 can be made easily.

Especially in the airbags 10 and 10C, six wrapping yarns 22 wrap the airbags in a braiding fashion. In this braid-wrapping, a wrapping yarn 23A, for example, holds the other yarn 24A at an intersection, and is held by another yarn 24B at another intersection along the axial direction X of the folded airbag body 26. Therefore, if the individual wrapping yarns 22 are wound around the airbag body 26 once or more with the transfer merely stopped, without having to move the winding position, the individual yarns 22 hold and bind one another to form a tied portion 29 easily for preventing the individual yarns 22 from loosening, as shown in FIGS. 20 and 21.

Figure 20:
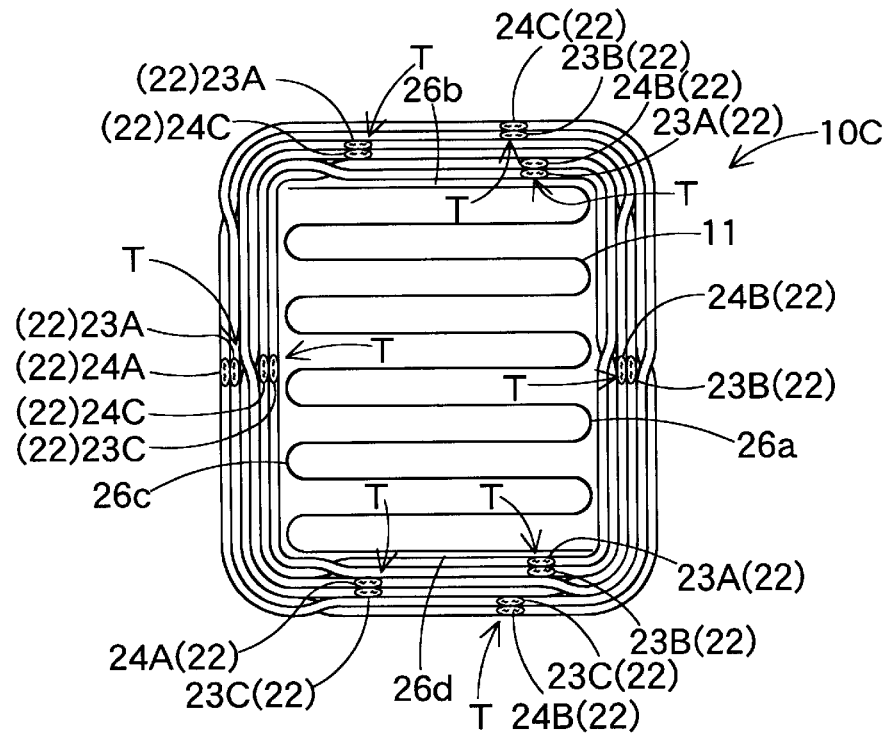
FIG. 20 is a schematic enlarged section taken along the line XX—XX of FIG. 19.
Figure 21:
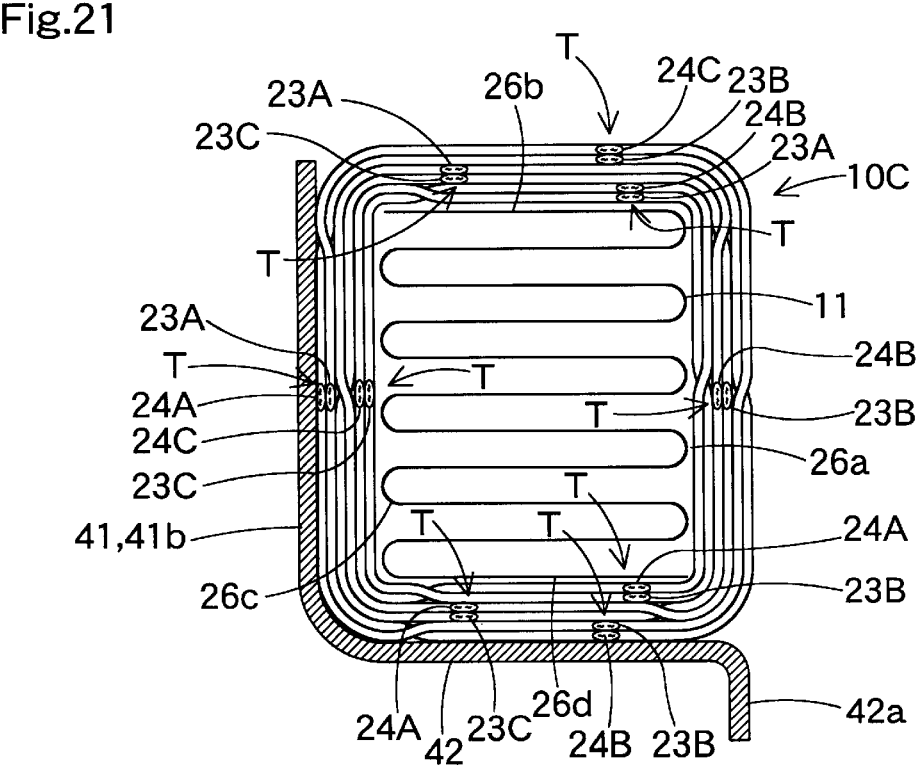
FIG. 21 is a schematic enlarged section taken along the line XXI—XXI of FIG. 19.
Figure 22:
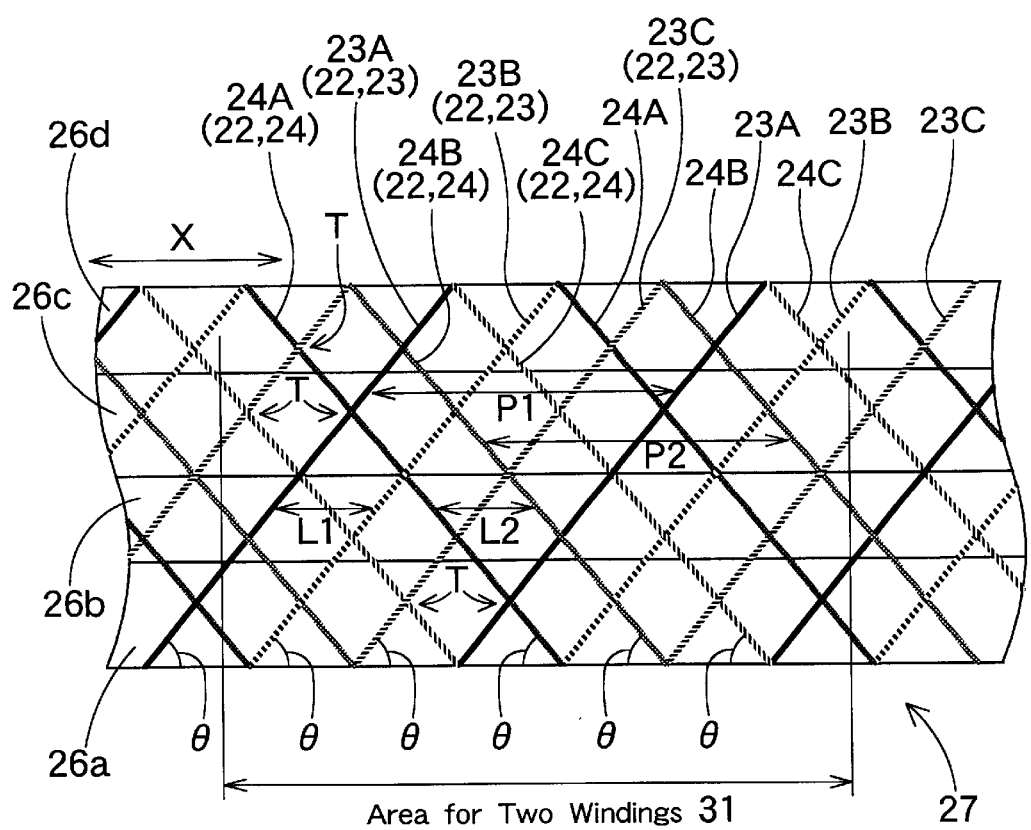
FIG. 22 is a development showing the airbag body in FIG. 19 wrapped by the wrapping yarns.

Here, although only nine intersections T of the yarns 22 are shown in FIGS. 20 and 21, there are actually thirty-six intersections T in the area 31 for two windings of six yarns 22, i.e., for two pitches, as shown in FIG. 22. Accordingly, one yarn 23A, for example, is held by other yarns 24A, 24B and 24C at six positions in the area 31 for two pitches. Therefore, if the wrapping yarns 22 are wound around the airbag body 26 in a braiding fashion with the transfer just stopped, without moving the winding position, a yarn 23A is held by other yarns 24A, 24B and 24C at six positions corresponding to the intersections, and further by the yarns 23B and 23C wound in the same direction, and even by the yarn 23A itself. Since this happens to the individual yarns 23A, 23B, 23C, 24A, 24B and 24C, the yarns are securely prevented from loosening over the wrapping areas 27A and 27B at the tied portion 29.

In the airbag 10C, therefore, the airbag body 26 in the wrapping areas 27A and 27B stay in a compact shape by a simple wrapping work, and the end treatment at the end portions 27Aa, 27Ab, 27Ba and 27Bb of the wrapping areas 27A and 27B, which prevents the loosening of the wrapping yarns 22, is made easily. Therefore, the airbag 1C wrapped can be manufactured with less work and at low cost.

Here, the airbag 10C only differs from the airbag 10 in not using the tape member 46 used in the airbag 10, but is the same as the airbag 10 in folding and wrapping works, the assembly of the airbag assembly 50, and the mounting on a vehicle.

Moreover, in the airbags 10 and 10C, the folded airbag body 26 includes the front and rear wrapping areas 27A and 27B as separated longitudinally, and is provided with the inner side tied portions 29b at the adjacent end portions 27Ab and 27Ba of the front and rear wrapping areas 27A and 27B. In the portion 28 of the folded airbag body 26 between the adjacent tied portions 29b and 29b of the front and rear wrapping areas 27A and 27B, six wrapping yarns 22 are connected along the axial direction X of the folded airbag body 26.

If the folded airbag body 26 includes more than one wrapping areas 27A and 27B, therefore, the braiding work can be done without cutting off the wrapping yarns 22, but with the yarns connected, between the end portions 29a and 29a of the adjacent wrapping areas 27A and 27B, as shown in FIG. 23. Therefore, the wrapping work can be done efficiently in the wrapping areas 27A and 27B. In the excluded portion 28, moreover, the wrapping yarns 22 are not wound around the folded airbag body 26, nor does the bobbin carrier 55 of the wrapping machine 54 even rotate. Instead, the transfer means 59 is just operated to advance the airbag body 26 forward. Therefore, a plurality of wrapping areas 27A and 27B are wrapped easily.

Moreover, in the airbags 10 and 10C, the joint mouth portion 15 is provided in the portion 28 of the airbag body 26 between the front and rear wrapping areas 27A and 27B as separated longitudinally. The joint mouth portion 15 is to be connected to the inflator 34 for supplying the inflation gas G, and to introduce the same into the airbag body 11. In the airbags 10 and 10C, the joint mouth portion 15 is easily connected to the inflator 34.

More specifically, at the excluded portion 28 between the front and rear wrapping areas 27A and 27B as separated longitudinally, six wrapping yarns 22 are merely extended along the axial direction X of the folded airbag body 26. Therefore, the joint mouth portion 15 can be easily extracted from the gap between the predetermined wrapping yarns 22, to be connected to the inflator 34 smoothly.

In the airbags 10 and 10C, six wrapping yarns 23A, 23B, 23C, 24A, 24B and 24C are used to wrap the airbag body 26. However, the airbag body 26 can be wrapped with at least two wrapping yarns 22 only while avoiding the use of the tape member 45 to the utmost, on condition that the yarns are wound around the outer circumference of the wrapping area 27 (27A and 27B) of the folded body 26 in a braiding fashion.

Figure 24:
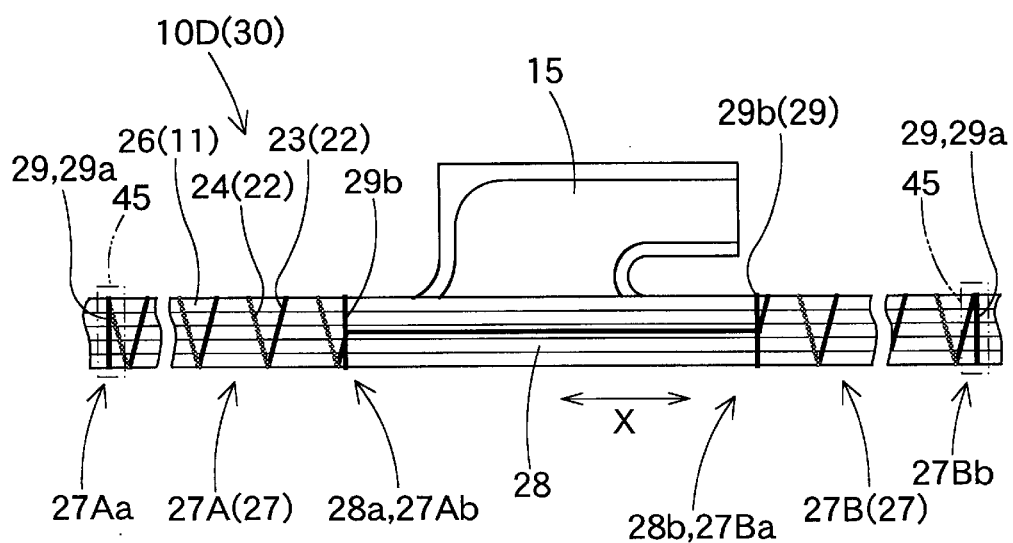
FIG. 24 is a partial front view of still another modification of the airbag.
Figure 25:
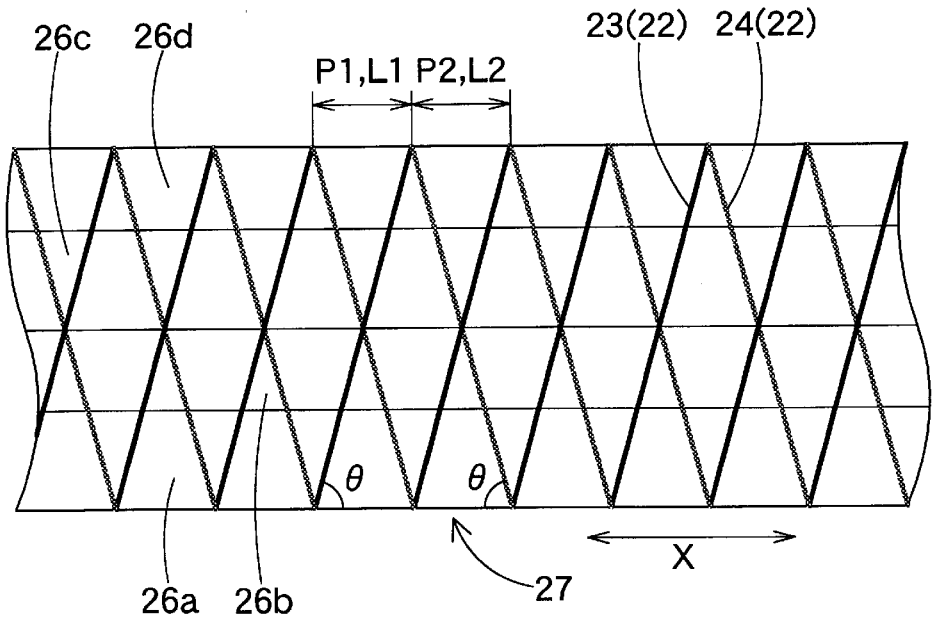
FIG. 25 is a development showing the airbag body in FIG. 24 wrapped by the wrapping yarns.

In the airbag 10D shown in FIGS. 24 and 25, for example, two wrapping yarns 23 and 24 are wound around the body 26 in a braiding fashion in the wrapping areas 27A and 27B. Here, the wrapping yarns 23 and 24 are the same yarns as the yarns 22 in the embodiment. With respect to either one of the wrapping yarns 23 or 24, the distances L1 and L2 between the adjacent yarns along the axial direction X of the folded body 26 are both set to 30 mm. The winding pitches P1 and P2 of the individual yarns 23 and 24 are set to 30 mm, which coincides with the inter-yarn distances L1 and L2. The intersection angle θ between the individual yarns 23 and 24 and the body axial direction X is set to about 75°. Even with this wrapping fashion, the same working-effects as the embodiment are obtained if tied portions 29 (29a and 29b) are formed by winding the braiding wrapping yarns 23 and 24 at the end portions 27Aa, 27Ab, 27Ba and 27Bb of the wrapping areas 27A and 27B without moving the yarns in the axial direction X of the airbag body 26. Here, when only two wrapping yarns 23 and 24 are used, the yarns 23 and 24 are desirably wound twice or more for preventing the loosening of the tied portions 29.

Figure 26:
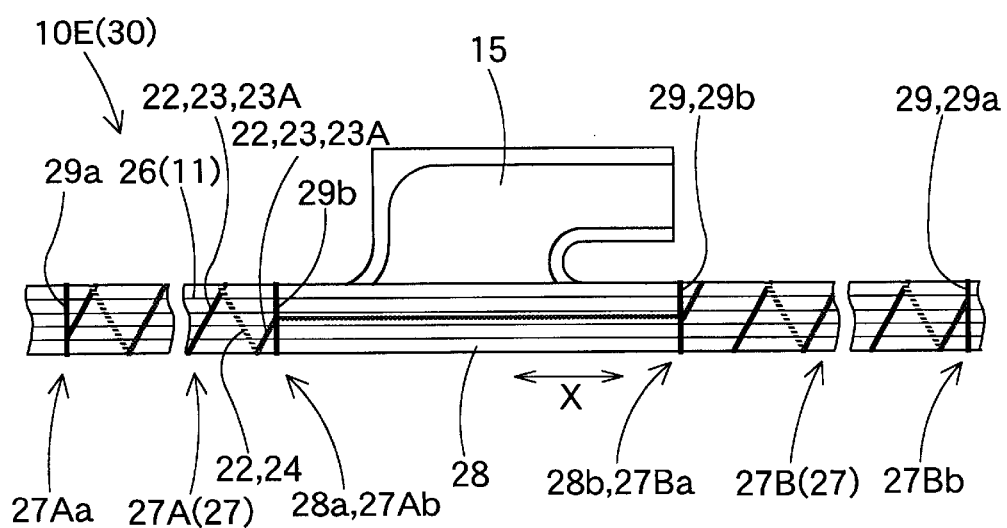
FIG. 26 is a partial front view of yet another modification of the airbag.
Figure 27:
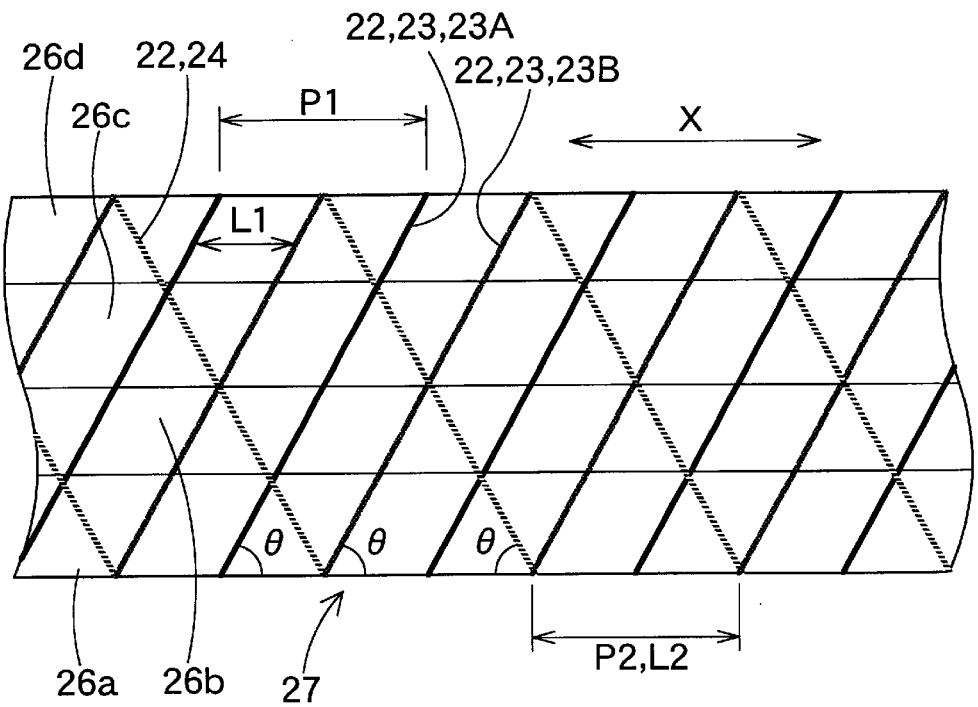
FIG. 27 is a development showing the airbag body in FIG. 26 wrapped by the wrapping yarns.
Figure 28:
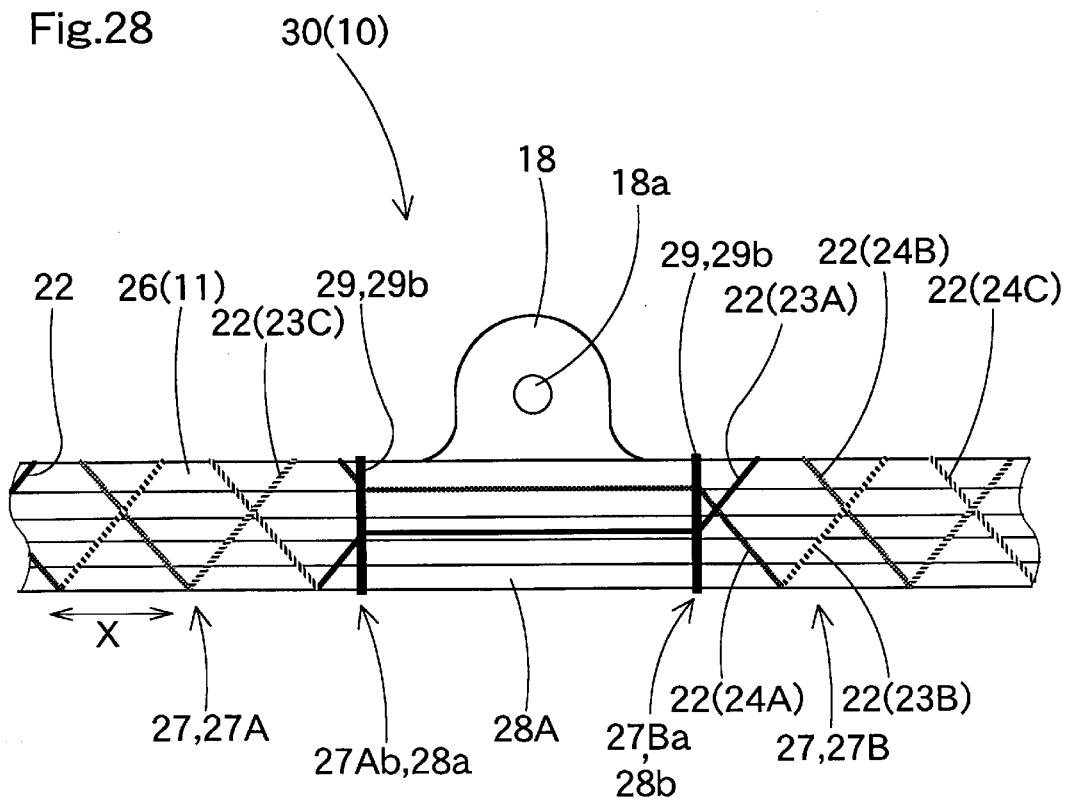
FIG. 28 shows still another modification of the airbag.

In the airbag 10E shown in FIGS. 26 and 27, alternatively, the folded body 26 is wrapped by two yarns 23A and 23B and a yarn 24 in a braiding fashion in the wrapping areas 27A and 27B, for example. The individual yarns 23A, 23B and 24 are the same yarns as the wrapping yarns 22 of the embodiment. The distance L1 between the adjacent yarns with respect to the yarns 23A and 23B, which are wound in the same direction, along the axial direction X of the folded body 26 is set to 30 mm. Each of the winding pitch P1 of the yarns 23A and 23B is 60 mm, respectively, and the intersection angles θ between the individual yarns 23A and 23B and the body axial direction X are both about 61°. The inter-yarn distance L2 of the yarn 24 along the axial direction X of the body 26 is 60 mm, which is the same as the winding pitch P2 of the yarn 24, and the intersection angle θ between the yarn 24 and the body axial direction X is about 61°. With this construction, the same working-effects as the embodiment are obtained, if tied portions 29 (29a and 29b) are formed by winding the braiding wrapping yarns 23A, 23B and 24 once or more at the end portions 27Aa, 27Ab, 27Ba and 27Bb of the wrapping areas 27A and 27B without moving the yarns in the axial direction X of the airbag body 26.

Therefore, three to five, or more than seven wrapping yarns 22 may be used to braid-wrap the folded body 26, on condition that the number of yarns is more than two. When a tied portion 29 is formed, it is easily created by winding the yarns 22 in a braiding fashion at the same position of the folded body 26 once or more, and prevents the loosening of the yarns 22.

Moreover, in the airbags 10 and 10C, the excluded portions 28 with no braid-wrapping are formed at the positions of the mounting portions 18C, too, in addition to the joint mouth portion 15, which facilitates the extraction of the mounting portions 18C, thereby smoothing the attachment of the mounting brackets 41 to the mounting portions 18C. In this case, the following construction may be adopted. Specifically, the excluded portions 28A with no braid-wrapping are formed at the portion of the mounting portions 18. Then the tied portions 29 are formed at the front and rear end portions 28a and 28b of the excluded portion 28A (or the end portions 27Ab and 27Ba of the wrapping areas 27A and 27B), and the individual yarns 22 are arranged generally along the axial direction X of the airbag body 26 between the tied portions 29 and 29. This way, the mounting portions 18 are easily taken out after wrapping.

Of course, if it is anticipated that the end side tied portions 29a and 29a at the front and rear end side of the folded airbag body 26 may loosen in relation with surrounding members in the course of handling such as the transfer, a tearable tape member 45 may be wound around each of the end side tied portions 29a (refer to FIG. 24). Even if the tearable tape member 45 is wound around these portions, the working-effects of the present invention are not remarkably decreased compared with the conventional wrapping manner of winding tape material intermittently, since the number of the winding portions is reduced.

What is claimed is:

1. An airbag comprising an airbag body and a wrapping member made tearable for keeping said airbag body in the folded-up configuration, wherein:

said airbag body is folded and housed in the peripheral edge of an opening on the inner side of a vehicular body, and is so wrapped by said wrapping member after being folded as to expand and inflate to cover said opening when the inflation gas flows in;

said wrapping member comprises a plurality of flexible wrapping yarns;

said wrapping yarns in plurality are wound around the outer circumference of said airbag body as folded into a generally rod-like shape over the entire length of the wrapping area of said airbag body, along the axial direction of said airbag body and in a manner to intersect said axial direction obliquely;

at least two wrapping yarns out of said wrapping yarns in plurality are wound around said folded airbag body from opposite directions to each other in the wrapping area;

the distance between the adjacent yarns along the axial direction of said folded airbag body is within the range of 20 to 60 mm, with respect to the wrapping yarns wound in the same direction in the wrapping area, when a plurality of said wrapping yarns are wound around said folded airbag body; and the yarn strength according to JIS L 1013.7.5 of each of said wrapping yarns is within the range of 7.4 to 65N.

2. An airbag according to claim 1, wherein said wrapping yarns in plurality in said wrapping area are wound around said folded airbag body at the intersection angle of 45° or more with respect to the axial direction of said airbag body.

3. An airbag according to claim 1, wherein more than six of said wrapping yarns are used.

4. An airbag according to claim 1, wherein six of said wrapping yarns are used, and two groups of three wrapping yarns are wound around said airbag body in opposite directions to each other.

5. An airbag according to claim 1, wherein two of said wrapping yarns are used, and two groups of one wrapping yarn are wound around said airbag body in opposite directions to each other.

6. An airbag according to claim 1, wherein three of said wrapping yarns are used, and two groups, each of two yarns and one yarn, are wound around said airbag body in opposite directions to each other.

7. An airbag according to claim 1, wherein the extension according to JIS L 1013.7.5 of said wrapping yarns is within the range of 10 to 30%.

8. An airbag according to claim 1, wherein:

said airbag body is provided at the upper edge thereof in the wrapping area with mounting portions for mounting said airbag body on said vehicular body; and the winding pitch in the vicinity of said mounting portions is widened compared with other portions.

9. An airbag comprising an airbag body and a wrapping member made tearable for keeping said airbag body in the folded-up configuration, wherein:

said airbag body is folded and housed in the peripheral edge of an opening on the inner side of a vehicular body, and is so wrapped by said wrapping member after being folded as to expand and inflate to cover said opening when the inflation gas flows in;

said wrapping member comprises a plurality of wrapping yarns which wind around said airbag body as folded into a generally rod-like shape in a braiding fashion, along the axial direction of said airbag body and in a manner to intersect said axial direction obliquely;

said airbag body includes a wrapping area which is wound by said plural wrapping yarns in a braiding fashion, and is prevented from loosing the folded-up configuration;

said wrapping area has a tied portion for preventing said wrapping yarns from loosening, said tied portion being formed by winding and tying said wrapping yarns braiding at the ends of said wrapping area without moving the yarns in the axial direction of said airbag body.

10. An airbag according to claim 9, wherein said tied portion is formed by winding said wrapping yarns in plurality twice or more.

11. An airbag according to claim 9, wherein:

said airbag body includes at least two wrapping areas at the front and rear sides as separated in the vehicle's longitudinal direction;

said tied portions are formed at the adjacent ends of said front and rear wrapping areas; and said wrapping yarns are connected generally along the axial direction of said folded airbag body at the portion of said airbag body between said two adjacent tied portions of said front and rear wrapping areas.

12. An airbag according to claim 11, wherein a joint mouth portion is arranged at the portion of said airbag body between said front and rear wrapping areas as separated in the longitudinal direction, said joint mouth portion introducing inflation gas into said airbag body by being connected to an inflator for supplying the inflation gas.

13. An airbag according to claim 11, wherein amounting portion for mounting said airbag body on a vehicular body is provided at the portion of said airbag body between said front and rear wrapping areas as separated longitudinally.

14. An airbag according to claim 11, wherein a tearable tape member is wound around the tied portions at the front and rear ends of said airbag body.

* * * * *